(12) United States Patent
Ceroll et al.

(10) Patent No.: US 11,344,961 B2
(45) Date of Patent: May 31, 2022

(54) PIPE THREADING OR CUTTING DEVICE

(71) Applicant: Black & Decker Inc., Newark, DE (US)

(72) Inventors: Warren A. Ceroll, Owings Mills, MD (US); Jinhua Ye, Suzhou (CN); John Michael Peiffer, Middle River, MD (US); Paul G. Gross, White Marsh, MD (US); Daniel Puzio, Baltimore, MD (US); Scott M. Rudolph, Aberdeen, MD (US); Youwei Cai, Suzhou (CN); Zhenyang Bi, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 358 days.

(21) Appl. No.: 16/218,011

(22) Filed: Dec. 12, 2018

(65) Prior Publication Data
US 2020/0189017 A1    Jun. 18, 2020

(51) Int. Cl.
*B23G 1/52*    (2006.01)
*B23G 1/24*    (2006.01)
(Continued)

(52) U.S. Cl.
CPC .............. *B23G 1/52* (2013.01); *B23G 1/24* (2013.01); *B23G 1/48* (2013.01); *B25B 5/02* (2013.01);
(Continued)

(58) Field of Classification Search
CPC ........... B23B 31/102; B23B 5/02; B23B 5/12; B23B 5/147; B23G 1/48; B23G 1/52;
(Continued)

(56) References Cited

U.S. PATENT DOCUMENTS 1,705,240 A    3/1929    Frank
1,852,776 A    4/1932    Hodeaux
(Continued)

FOREIGN PATENT DOCUMENTS

CN    1036161 A    10/1989
CN    203495649 U    3/2014
(Continued)

OTHER PUBLICATIONS

Extended European Search Report dated May 13, 2020, Application No. 19202388.5.
(Continued)

*Primary Examiner* — Sara Addisu
(74) *Attorney, Agent, or Firm* — Scott B. Markow

(57) ABSTRACT

A modification system for the modification of elongated pieces of stock may include a powered tool for modifying, or altering the piece of elongated stock, and a support device for supporting a position of the elongated stock relative to the powered tool. An arrangement of the components of the powered tool may provide for ergonomic balance of the powered tool. The support device may include a clamping device that clamps, or holds the elongated stock, and an adjustment device that adjusts a position of the clamping device based on a size of the elongated stock. The support device may include a latching device that maintains the position of the clamping device relative to the stock. A reaction arm may inhibit rotation of the tool relative to the stock during operation. A biasing device may provide for application of an axial biasing force on the stock, to initiate operation.

20 Claims, 30 Drawing Sheets

(51) Int. Cl.
    *B23G 1/48* (2006.01)
    *B25B 5/02* (2006.01)
    *B25B 5/12* (2006.01)
    *B25B 5/14* (2006.01)

(52) U.S. Cl.
    CPC ............... *B25B 5/12* (2013.01); *B25B 5/147* (2013.01); *B23G 2200/08* (2013.01); *B23G 2240/40* (2013.01)

(58) Field of Classification Search
    CPC ............ B23G 2200/08; B23G 2240/40; B23G 2240/52; B23G 1/24; B23G 1/22; B23G 1/46; Y10T 82/22; Y10T 408/68
    See application file for complete search history.

(56) References Cited

U.S. PATENT DOCUMENTS

| | | | |
|---|---|---|---|
| 2,097,358 A | 10/1937 | Clay |
| 2,599,696 A | 6/1952 | Clark |
| 2,678,453 A | 5/1954 | Rudolph |
| 2,770,820 A | 11/1956 | Adolph et al. |
| 2,879,678 A | 3/1959 | Kaiser |
| 3,170,214 A | 2/1965 | Downie |
| 3,316,571 A | 5/1967 | Cutrone |
| 3,354,784 A | 11/1967 | Zemberry |
| 4,209,274 A | 6/1980 | Martin et al. |
| 4,231,454 A | 11/1980 | Bickford et al. |
| 4,279,182 A | 7/1981 | Miyagawa et al. |
| 4,501,519 A | 2/1985 | Leon |
| 4,502,821 A | 3/1985 | Wagner |
| D288,167 S | 2/1987 | Urspruch |
| 4,655,108 A | 4/1987 | Galos |
| 4,669,929 A | 6/1987 | Olesen |
| 4,720,000 A | 1/1988 | Snyder |
| 4,808,047 A | 2/1989 | Calevich et al. |
| 4,911,587 A | 3/1990 | Stych |
| 4,953,292 A | 9/1990 | Tobey |
| D325,504 S | 4/1992 | Tobey |
| 5,132,912 A | 7/1992 | Ito et al. |
| 5,184,053 A | 2/1993 | Maruo et al. |
| 5,203,650 A | 4/1993 | McCourtney |
| 5,307,549 A | 5/1994 | Tsutsumi et al. |
| D365,581 S | 12/1995 | McCourtney |
| 5,495,672 A | 3/1996 | Kritchever et al. |
| 5,528,830 A | 6/1996 | Hansen |
| 5,829,142 A | 11/1998 | Rieser |
| 5,857,814 A | 1/1999 | Jang |
| 5,938,378 A | 8/1999 | Omi et al. |
| 6,111,382 A | 8/2000 | Tsutsui |
| 6,202,522 B1 | 3/2001 | Tremblay |
| 6,551,033 B2 | 4/2003 | Kakino et al. |
| 6,698,048 B1 | 3/2004 | Greene |
| D568,701 S | 5/2008 | Nasiell |
| D568,702 S | 5/2008 | Nasiell |
| 7,406,769 B1 | 8/2008 | Toussaint |
| 7,845,080 B2 | 12/2010 | Nasiell |
| 8,033,024 B2 | 10/2011 | Goop |
| 8,065,938 B1 | 11/2011 | Kravitch |
| 8,266,991 B2 | 9/2012 | Thorson et al. |
| 8,424,424 B1 | 4/2013 | Kravitch |
| 8,511,945 B2 | 8/2013 | Apkarian et al. |
| 8,662,799 B2 | 3/2014 | Takayama et al. |
| 8,733,215 B1 | 5/2014 | Kravitch |
| 9,095,917 B2 | 8/2015 | Patil et al. |
| 9,138,818 B2 | 9/2015 | Kundracik et al. |
| 9,302,402 B2 | 4/2016 | Thorson et al. |
| 9,434,014 B1 | 9/2016 | Krueger |
| 9,452,513 B1 | 9/2016 | Kravitch |
| 9,505,067 B1 | 11/2016 | Nasiell et al. |
| 9,566,652 B2 | 2/2017 | Nasiell |
| 9,957,744 B2 | 5/2018 | Hamman et al. |
| 11,077,509 B2 | 8/2021 | VanDaalwyk |
| 2010/0269649 A1 | 10/2010 | Rantz |
| 2014/0056660 A1* | 2/2014 | Eshleman ............ B23B 51/009 408/9 |
| 2014/0166323 A1 | 6/2014 | Cooper |
| 2015/0165534 A1 | 6/2015 | Hamm |
| 2015/0343543 A1 | 12/2015 | Kundracik et al. |
| 2016/0214265 A1 | 7/2016 | Thorson et al. |
| 2016/0342142 A1 | 11/2016 | Boeck et al. |
| 2016/0375570 A1 | 12/2016 | Boeck et al. |
| 2017/0008159 A1 | 1/2017 | Boeck et al. |
| 2017/0057038 A1 | 3/2017 | Coleman |
| 2017/0234484 A1 | 8/2017 | Vanko et al. |
| 2018/0147713 A1 | 5/2018 | Schmauder et al. |
| 2021/0331262 A1 | 10/2021 | VanDaalwyk |

FOREIGN PATENT DOCUMENTS

| | | |
|---|---|---|
| DE | 946321 C | 7/1956 |
| DE | 8318378 U1 | 5/1984 |
| DE | 4231975 A1 | 4/1993 |
| EP | 1457285 A1 | 9/2004 |
| GB | 2422800 A | 8/2006 |
| JP | S4710994 U | 10/1972 |

OTHER PUBLICATIONS

Translation of DE 946,321, issued Jul. 26, 1956, inventor Albert Roller.

\* cited by examiner

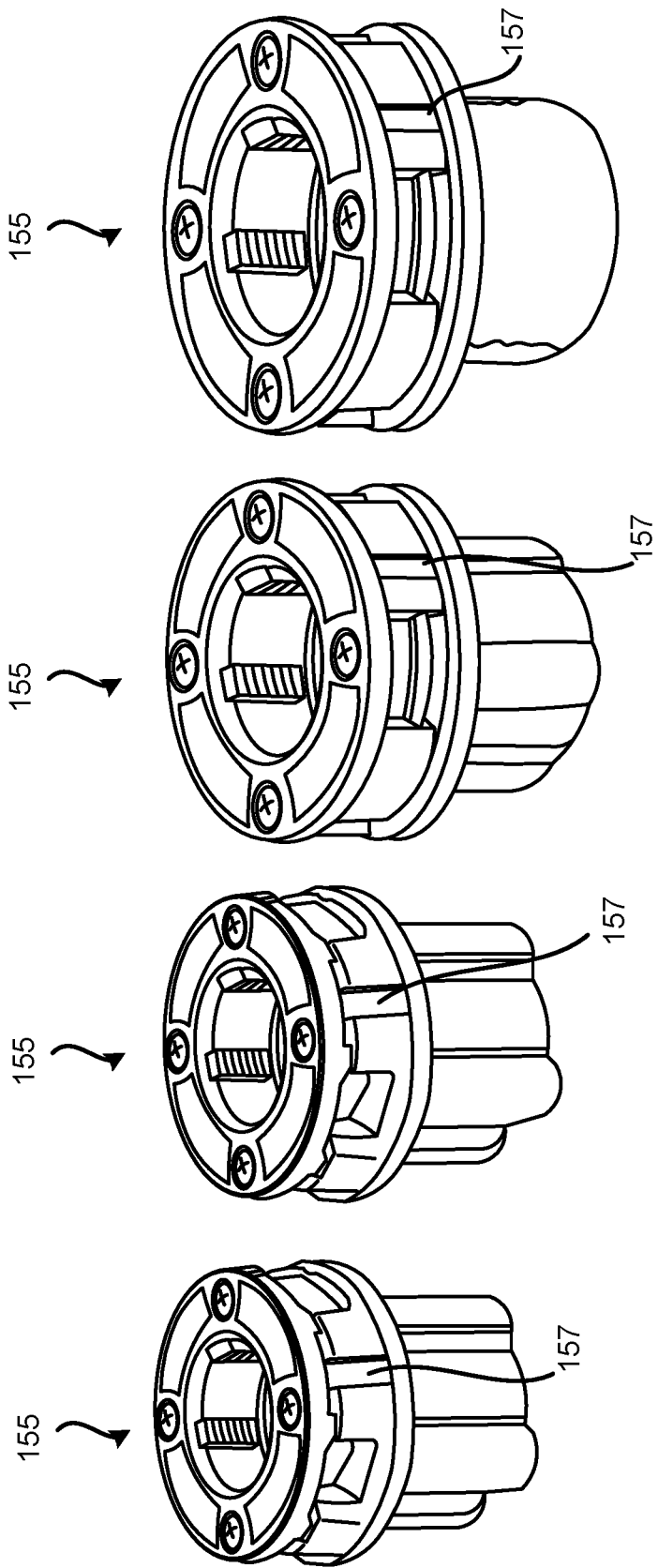

PIPE THREADING OR CUTTING DEVICE

FIELD

This document relates, generally, to a powered modification devices for modification of elongated pieces of stock, and in particular, to thread forming devices or cutting devices.

BACKGROUND

Pipe threading devices may form threads on an outer surface of a pipe. Pipe cutting devices may cut a pipe to a desired length. In a handheld modification device such as a pipe threading device or a pipe cutting device, ergonomic balance of the components of the device may improve user control of the device, and enhance operational safety. An adjustable clamping mechanism may secure a position of a variety of different size workpieces relative to the device, improving the accuracy of the modification of the workpiece performed by the tool, allowing for relatively rapid transition from one workpiece to the next, and enhancing operational safety. Control of a motor, particularly in response to detected displacement indicative of kickback of the device relative to the workpiece, may also enhance utility and operational safety.

SUMMARY

In one aspect, a thread forming system may include a power tool. The power tool may include a tool housing and a cutting head configured to form threads in an elongated piece of stock, the cutting head being configured to receive the piece of stock, and to move axially along a longitudinal axis of the piece of stock to form the threads. The thread forming system may also include a support device. The support device may include a clamping device configured to secure a position of the piece of stock relative to the power tool for the cutting head to form the threads, a reaction arm coupled to the clamping device and configured to abut a retaining portion of the power tool to inhibit rotation of the housing relative to the piece of stock while the cutting head is forming threads, and a biasing device including a biasing arm having a first end portion thereof moveably coupled to the clamping device, the biasing device being configured to selectively engage the cutting head so as to bias the cutting head along the longitudinal axis.

In some implementations, the clamping device may also include an upper support bracket with a first clamping face configured to engage the piece of stock, and a lower support bracket movably coupled to the upper support bracket, with a second clamping face opposite the first clamping face and configured to engage the piece of stock. One of the upper support bracket or the lower support bracket may be rotatably moveable relative to the other of the upper support bracket or the lower support bracket.

In some implementations, the clamping device may also include a latching device including an over center latch coupled between the lower support bracket and the upper support bracket. The over center latch may include a latch handle, a first pivot pin rotatably coupling the latch handle to the upper support bracket, a link, a second pivot pin rotatably coupling a first end of the link to the latch handle, and a third pivot pin rotatably coupling a second end of the link to the lower support bracket. In a first position of the latch handle and the link, the upper support bracket may be rotatable relative to the lower support bracket. In a second position of the latch handle and the link, rotation of the upper support bracket relative to the lower support bracket may be restricted, such that a relative position of the upper support bracket and the lower support bracket may be secured. The latch handle and the link may be moved from the first position to the second position in response to rotation of the latch handle about the first pivot pin in a first direction, in which the second pivot pin and the first end portion of the link are moved past an alignment position with the first pivot pin and the third pivot pin.

In some implementations, a fourth pin may rotatably couple an end portion of a release handle to the latch handle. In the first position, the release handle may be aligned along the latch handle. In the second position, the release handle may be rotated about the fourth pivot pin such that the release handle may be separated from the latch handle. The second pivot pin and the first end portion of the link may be rotated away from the lower support bracket in response to rotation of the release handle toward the latch handle to allow rotation of the upper support bracket and the lower support bracket.

In some implementations, the clamping device may include a threaded adjustment knob on the one of the upper support bracket or the lower support bracket. A position of one of the first clamping face or the second clamping face may be movable relative to the other of the first clamping face or the second clamping face in response to manipulation of the threaded adjusting knob. In some implementations, the first clamping face may be stationary, and the second clamping face may be movable in a first direction toward the first clamping face in response to manipulation of the threaded adjusting knob in a first direction, and the second clamping face may be movable in a second direction away from the first clamping face in response to manipulation of the threaded adjusting knob in a second direction.

In some implementations, the tool housing may extend transverse to the piece of stock when the cutting head is forming threads, and the reaction arm may extend transverse to the tool housing when the cutting head is forming threads.

In some implementations, the biasing arm may be pivotable relative to the clamping device. In some implementations, the biasing device may include a biasing plate coupled to a second end portion of the biasing arm. The biasing plate may be configured to selectively contact the cutting head based on a position of the biasing arm relative to the clamping device. The biasing plate may be configured to transfer an axial force to the cutting head in response to an external force applied to the biasing device, as the as the biasing arm and the biasing plate pivot relative to the clamping device, and toward the cutting head.

In some implementations, the power tool may include a motor for driving the cutting head, a motion sensor configured to sense rotational motion of the housing about the longitudinal axis, and a controller configured to control operation of the motor and to initiate a protective operation when the sensed rotational motion exceeds a predetermined threshold. The sensed rotational motion may include at least one of a rotational displacement, a rotational velocity, or a rotational acceleration. The protective operation may include at least one of shutting off power to the motor, reducing power to the motor, pulsing power to the motor, braking the motor, or reversing a direction of rotation of the motor. The sensor may be at least one of a gyroscope or an accelerometer.

In some implementations, the tool housing may include a battery housing defining an internal cavity configured to receive a battery, a motor housing adjacent to the battery housing that contains a motor, and a transmission positioned between the motor housing and the cutting head, the transmission housing containing a transmission that is driven by the motor. In some implementations, the power tool may also include a first handle coupled to a first end portion of the tool housing, such that the battery housing is positioned between the first handle and the motor housing, and a second handle coupled to the cutting head. A center of gravity of the power tool may be positioned along the tool housing, at a position substantially aligned with the second handle.

In another aspect, a power tool for at least one of cutting or threading a pipe may include a tool housing. The tool housing may include a battery housing defining an internal cavity configured to receive a battery, a motor housing adjacent to the battery housing that contains a motor, and a transmission housing adjacent to the motor housing that contains a transmission that is driven by the motor. The power tool may also include a first handle coupled to a first end portion of the tool housing, such that the battery housing is positioned between the first handle and the motor housing, an operating head coupled to a second end portion of the tool housing and configured to receive a die cutting assembly driven by the motor and the transmission to perform at least one of a cutting operation or a threading operation on a pipe, wherein the transmission housing is positioned between the motor housing and the operating head, and a second handle coupled to the operating head. In some implementations, a center of gravity of the power tool may be positioned along the tool housing, at a position substantially aligned with the second handle.

In some implementations, a battery housing cover may be pivotably coupled to the housing, so as to selectively open and close an opening into the cavity defined in the battery housing.

In some implementations, the first handle, the battery housing, the motor housing, the transmission housing and the operating head may be sequentially aligned along a longitudinal axis of the tool housing. In some implementations, center of gravity of the power tool may be at a position corresponding to the transmission housing. In some implementations, a center of gravity of the power tool is positioned along the tool axis proximate the operating head, with a battery received in the housing.

In some implementations, the second handle may extend outward from an outer circumferential surface of the operating head. The second handle may include a retaining portion extending radially outward from the outer circumferential surface of the operating head, the retaining portion defining a retaining slot, and a grasping portion coupled to the retaining portion, extending transverse to the tool axis. The retaining slot may be configured to retain a reaction arm of a support device securing a pipe for manipulation by the operating head.

In some implementations, the operating head may be configured to receive a plurality of different cutting die assemblies. Each of the plurality of different cutting die assemblies may correspond to a size of a pipe to be threaded by the respective die assembly.

In some implementations, the power tool may include a sensor configured to sense rotational motion of the tool housing relative to a rotational axis of the cutting head, and a controller configured to control operation of the motor, and to initiate a protective operation when the sensed rotational motion exceeds a predetermined threshold. The sensor may be configured to sense at least one of a rotational position, rotational velocity, or a rotational acceleration about a rotational axis of the operating head. The protective operation may include at least one of shutting off power to the motor, reducing power to the motor, pulsing power to the motor, braking the motor, or reversing a direction of rotation of the motor. The sensor may be at least one of a gyroscope or an accelerometer.

In some implementations, the motor may be a brushless DC motor. The motor may operate at a first speed in a first direction. The motor may operate at a second speed in a second direction opposite the first direction. The second speed may be greater than the first speed. Operation of the motor in the first direction may cause the cutting die cutting assembly to rotate in the first direction so as to engage an end portion of a pipe for threading. Operation of the motor in the second direction may cause the die cutting assembly to rotate in a second direction so as to disengage the end portion of the pipe.

In another aspect, a power tool for cutting or threading a pipe may include a tool housing extending along a tool axis, an operating head coupled to the transmission housing, a motion sensor, and a controller. The tool housing may include a motor housing that contains a motor and a transmission housing that contains a transmission that is driven by the motor. The operating head may be driven by the motor and the transmission to rotate about an operating axis and perform at least one of a cutting operation and a threading operation on a pipe. The transmission housing may be positioned between the motor housing and the operating head. The motion sensor may be configured to sense rotational motion of the housing about the operating axis. The controller may be configured to control operation of the motor and to initiate a protective operation when the sensed rotational motion exceeds a predetermined threshold.

In some implementations, the tool may include a battery housing having a first end portion thereof coupled to the motor housing and configured to receive a battery therein, a first handle coupled to a second end portion of the battery housing, and a second handle positioned proximate the operating head and the transmission housing. The first handle, the battery housing, the motor housing, the transmission housing and the operating head may be sequentially aligned along a tool axis of the tool housing. A center of gravity of the tool may be aligned with the second handle.

In some implementations, the second handle may extend outward from an outer circumferential surface of the operating head. The second handle may include a retaining portion extending radially outward from the outer circumferential surface of the operating head. The retaining portion may define a retaining slot. The retaining slot may be configured to retain a reaction arm of a support device supporting a position of a pipe for manipulation by the operating head.

In some implementations, the operating head may be configured to receive a plurality of different cutting die assemblies. Each of the plurality of different cutting die assemblies may correspond to a size of a pipe to be threaded by the respective cutting die assembly.

In some implementations, the motion sensor may include at least one of a gyroscope or an accelerometer. The motion sensor may be configured to sense at least one of a rotational position, a rotational velocity, or a rotational acceleration about a rotational axis of the operating head.

In some implementations, the protective operation may include at least one of shutting off power to the motor, reducing power to the motor, pulsing power to the motor, braking the motor, or reversing a direction of rotation of the motor.

In some implementations, the motor may be a brushless DC motor. The motor may operate at a first speed in a first direction. The motor may operate at a second speed in a second direction opposite the first direction. The second speed may be greater than the first speed. Operation of the motor in the first direction may cause a cutting die cutting assembly received in the operating head to rotate in a first direction so as to engage an end portion of a pipe for threading. Operation of the motor in the second direction may cause the die cutting assembly to rotate in a second direction so as to disengage the end portion of the pipe.

The details of one or more implementations are set forth in the accompanying drawings and the description below. Other features will be apparent from the description and drawings, and from the claims.

BRIEF DESCRIPTION OF THE DRAWINGS

FIG. 3B illustrates exemplary cutting dies that may be removably coupled in the operating head, or head portion, shown in FIG. 3A, in accordance with implementations described herein.

DETAILED DESCRIPTION

Figure 1:
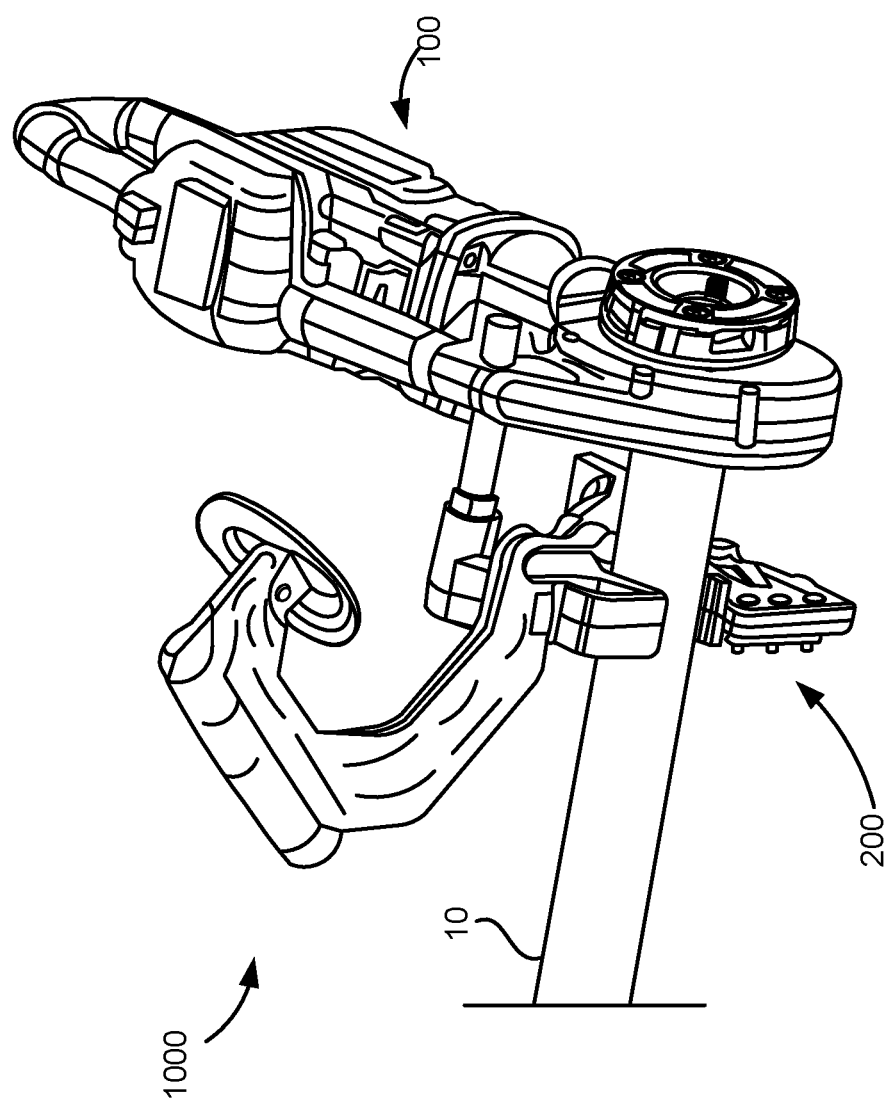
FIG. 1 is a perspective view of an example stock modification system, in accordance with implementations described herein.

An exemplary system for the modification, or alteration, of elongated pieces of stock is shown in FIG. 1. In some implementations, the exemplary system 1000 may include a modification device 100, or tool 100, and a support device 200, to modify a piece of elongated stock. In some implementations, the modification device 100, or tool 100, may be, for example, a powered, or motorized, pipe threader, or a powered, or motorized, pipe cutter. The modification device 100 may modify elongated pieces of stock, in the form of, for example, pipes, conduit, tubes, rods and other such types of elongated stock. For example, the exemplary modification device 100 in the form of a pipe threading tool may form threads in an outer circumferential surface portion of a piece of elongated stock. The exemplary modification device 100 in the form of a pipe cutting tool may score or cut a portion of elongated stock. Hereinafter, simply for ease of discussion and illustration, a modification system in the form of a thread forming system, including a pipe threading tool, will be presented to illustrate principles in connection with implementations described herein. Further, elongated stock to be modified by such a modification device, or modification system, may be referred to as a pipe hereinafter, simply for ease of discussion and illustration. However, the principles to be described herein may apply to other types of systems for the modification of various different types of elongated stock.

Figure 2A:
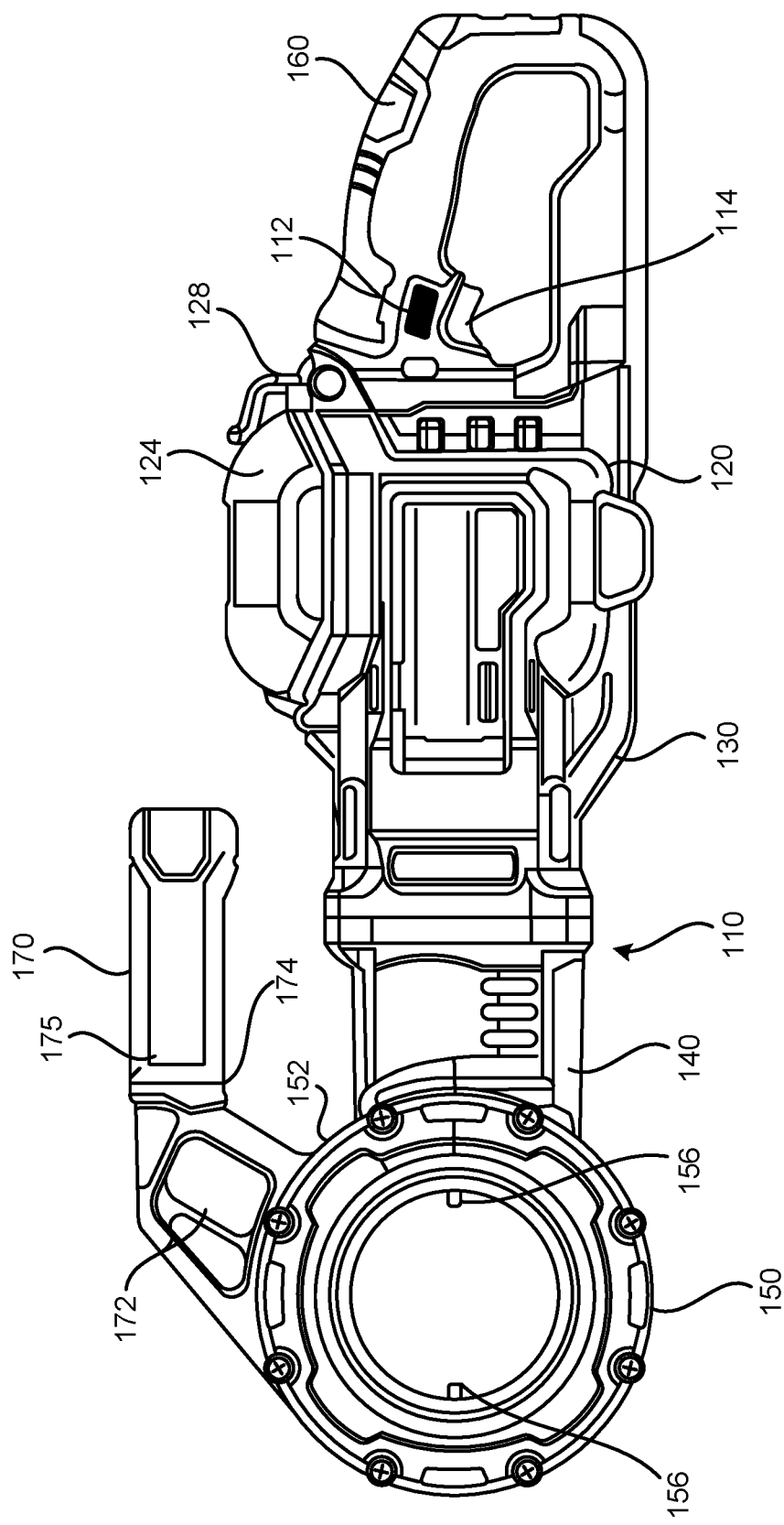
FIG. 2A is a side view of an exemplary modification device of the exemplary system shown in FIG. 1.
Figure 2B:
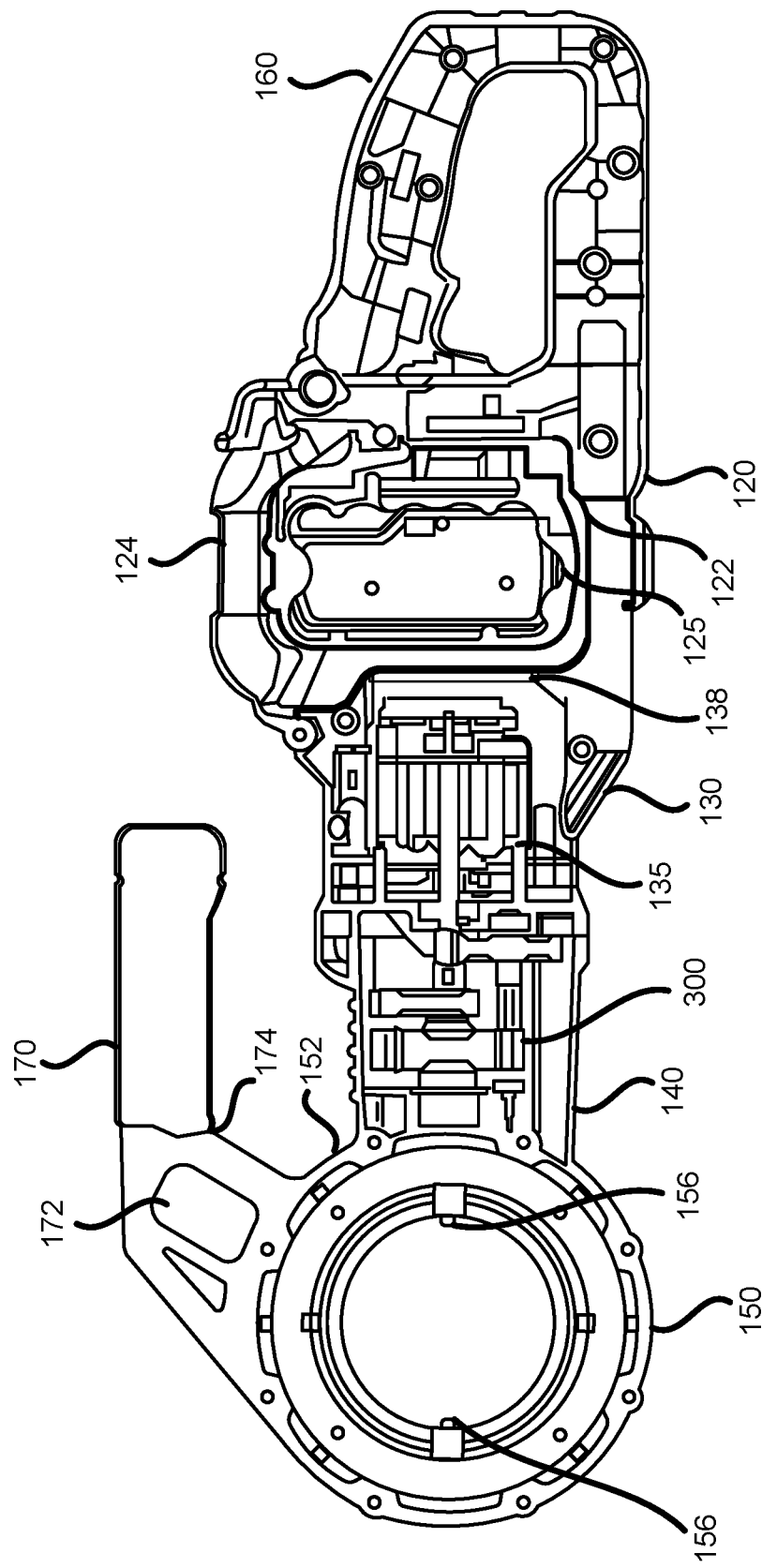
FIG. 2B is a cross-sectional view of the exemplary modification device shown in FIG. 2A, in accordance with implementations described herein.

The exemplary modification device 100, in the form of an exemplary thread forming tool 100, or pipe threader 100, is shown in FIGS. 2A and 2B, in which FIG. 2A is a side view and FIG. 2B is a cross-sectional view of the exemplary pipe threader 100. The exemplary pipe threader 100 may include a tool housing 110, including a battery housing 120, a motor housing 130, and a transmission housing 140 sequentially arranged along a longitudinal direction of the pipe threader 100. An operating head 150, or head portion 150, may be positioned at a working end portion, or forward end portion of the pipe threader 100. One of a plurality of different cutting dies 155 (see, for example, FIGS. 3A and 3B) may be removably received in the operating head 150, or operating portion 150. A first handle 160, or rear handle 160, may be positioned at a first end portion of the housing 110, adjacent to the battery housing 120. A second handle 170, or front handle 170, may be positioned at a second end portion of the housing 110, proximate the operating head 150 and/or the transmission housing 140. The front handle 170 may include, for example, retaining portion coupled to the operating head 150, including a retaining slot 172, and a grasping portion 175.

The battery housing 120 may define an internal cavity 122 in which a power storage device, or battery 125, may be removably received. In some implementations, a cover 124 may be coupled, for example, rotatably coupled, to the battery housing 120 to selectively open and close an opening into the cavity 122 for removal of the battery 125 from the cavity 122, and for replacement of the battery 125 into the cavity 122. The cover 124 may prevent unwanted material such as, for example, debris, moisture and the like, from entering the cavity 122 of the battery housing 120. The cover 124 may also contribute to the retention of the battery 125 in the cavity 122 of the battery housing 120, for example, during operation, transport, set up, and the like.

In some implementations, an indicator panel 128 may be provided on the housing 110. The indicator panel 128 may provide external indicators to an operator, related to operation of the pipe threader 100. For example, in some implementations, the indicator panel 128 may be selectively illuminated and/or selectively display one or more illumination patterns, to indicate an on/off state of the pipe threader 100, a capacity/charge level of the battery 125 received in the battery housing 120, and the like.

A motor 135 may be received in the motor housing 130. In some implementations, the motor 135 may be, for example, a brushless, bi-directional motor 135. That is, in some implementations, the motor 135 may be selectively operable in a forward direction, and in a reverse direction. In some implementations, an operational speed of the motor 135 may be varied, or changed, based on, for example, user selection. In some implementations, an operational speed of the motor 135 may be varied, or changed, based on, for example, an operation direction or mode of the motor 135. In some implementations, an operational direction, or operational mode, of the motor 135/pipe threader 100 may be selected by manipulation of a motor control switch 112, or forward/reverse switch 112, allowing for selection of one of a plurality of operational speeds of the motor 135 and/or selection of an operation direction of the motor 135. In some implementations, changes in the operational direction of the motor 135 may be achieved mechanically, by a reversing mechanism operably coupled with, for example, the motor 135 and/or the transmission 300 received in the transmission housing 140.

Figure 3A:
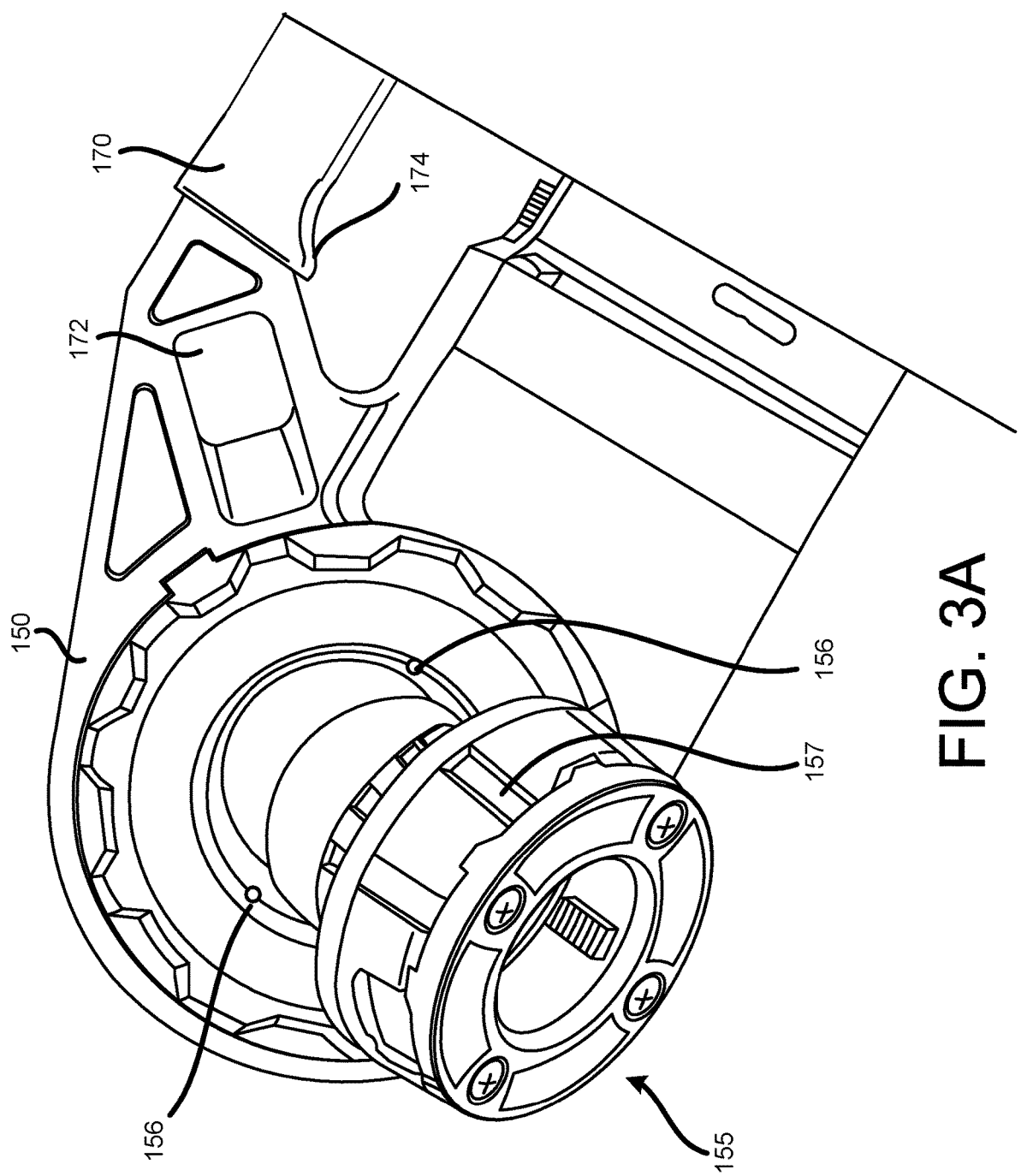
FIG. 3A illustrates an operating head, or head portion, of the exemplary modification device shown in FIGS. 2A and 2B.

As noted above, the cutting die 155 may be removably received in the operating head 150, as shown in more detail in FIG. 3A. In some implementations, the operating head 150 may accommodate one of a plurality of different cutting dies 155, as shown in FIG. 3B. The plurality of cutting dies 155 may have different sizes, for cutting and/or forming threads on different sized pipes, conduit, tubes, rods and the like. In some implementations, cutting dies 155 may be configured for forming external threads on an outer circumferential portion of a piece of stock. In some implementations, cutting dies 155 may be configured for forming internal threads on an inner circumferential portion of a piece of stock. In some implementations, the cutting dies 155 may be configured to score, or cut, a piece of stock to a desired length. In use, one of the plurality of cutting dies 155 may be selected, based on, for example, a size (i.e., a diameter) of a piece of stock to be threaded. In some implementations, the selected cutting die 155 may include a plurality of engagement recesses 157 formed in a housing of the cutting die 155. The plurality of engagement recesses 157 formed in the housing of the cutting die 155 may receive a respective plurality of die head engagement pins 156 installed in an inner circumferential portion of the operating head 150. In some implementations, the plurality of die head engagement pins 156 may be spring biased, for example, in a radially inward direction. Engagement of the plurality of engagement pins 156 in the plurality of engagement recesses 157 may retain a position of the cutting die 155 relative to, for example, an output gear installed in the operating head 150, such that the cutting die 155 and the output gear rotate together in the engaged state.

With the selected cutting die 155 coupled in the operating head 150 of the pipe threader 100 as described above, a piece of stock may be inserted into the cutting die 155. Power may be applied to the motor 135 by, for example, manipulation of a power switch 114, or trigger 114. A force generated by operation of the motor 135 in a first direction (for example, the forward direction) may be transmitted to the cutting die 155 via a transmission 300 received in the transmission housing 140. This force may, in turn, rotate the cutting die 155 in the first direction, causing the cutting die 155 to engage with an end portion of the piece of stock. For example, in a cutting die 155 configured for forming external threads in an outer circumferential portion of a piece of stock, rotation of the cutting die 155 in the first direction may cause the cutting die 155 to engage with the outer circumferential portion of the piece of stock positioned in the cutting die 155. In this exemplary arrangement, as the cutting die 155 rotates in the first direction relative to the piece of stock (for example, pipe), the cutting die 155 may move in a first axial direction along the pipe, as the cutting die 155 cuts threads into the outer circumferential portion of the pipe. When the cutting of the threads is completed, a direction of operation of the motor 135 may be reversed, for example, by manipulation of the forward/reverse switch 112. Operation of the motor 135 in the second direction, for example, the reverse direction, may cause the cutting die 155 to rotate in the second direction, and the cutting die 155 to move in a second axial direction along the pipe, and through the previously cut threads, releasing the engagement of the pipe and the cutting die 155. This will be described in more detail below.

Figure 4:
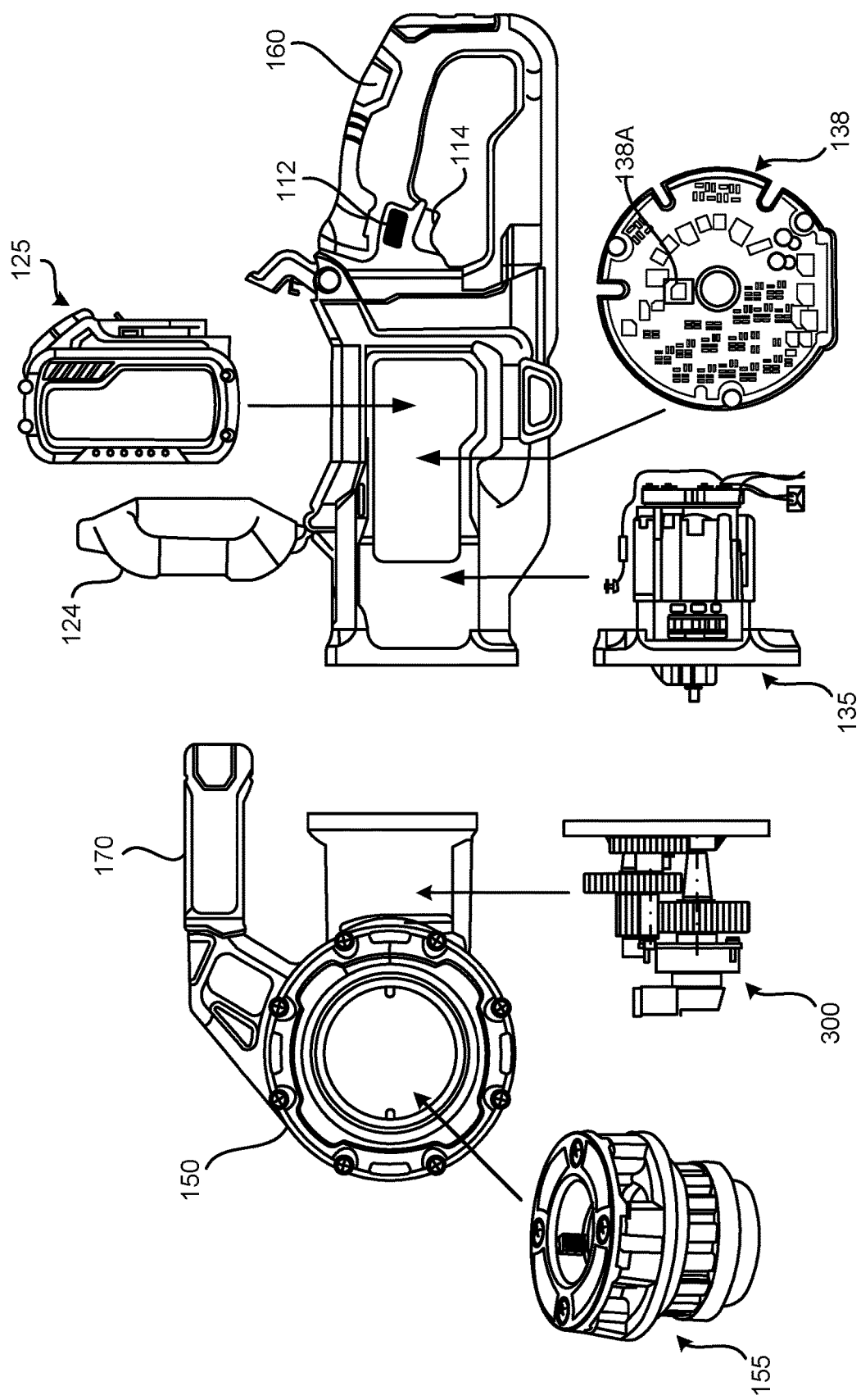
FIG. 4 illustrates a relative positioning of internal components of the exemplary modification device shown in FIGS. 2A and 2B, in accordance with implementations described herein.

In some implementations, the arrangement of the internal components of the pipe threader 100 may provide for ergonomic balance of the pipe threader 100. Ergonomic balance of the pipe threader 100 may improve user control during operation of the pipe threader 100, may improve precision of the modifications made to the workpiece/elongated stock during operation, and may enhance safety during operation of the pipe threader 100. FIG. 4 illustrates the relative placement of various internal components of the exemplary pipe threader 100, which may contribute to providing for ergonomic balance of the pipe threader 100.

Figure 5:
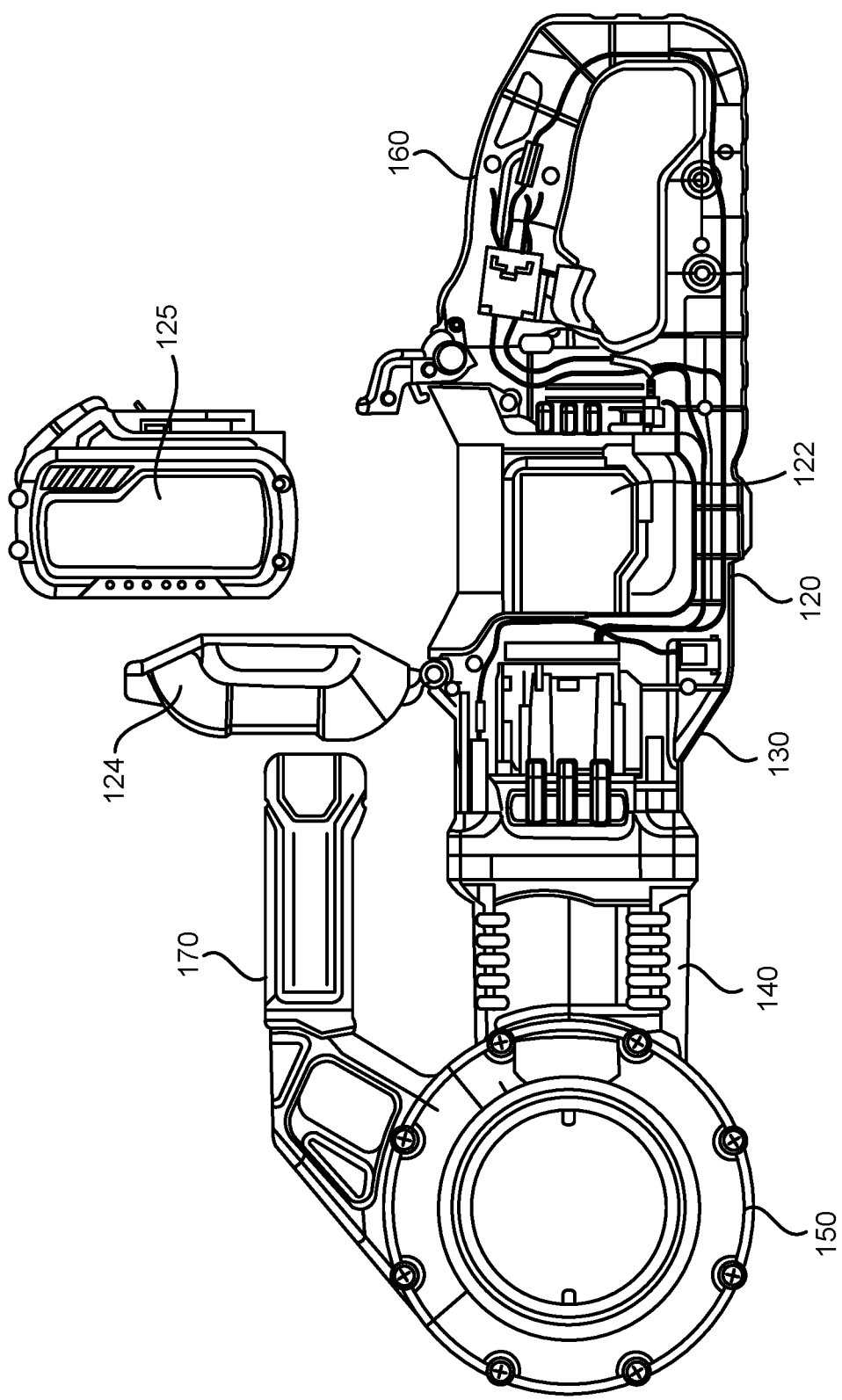
FIG. 5 illustrates a removable battery relative to a battery housing of the exemplary modification device shown in FIGS. 2A and 2B, in accordance with implementations described herein.

As shown in FIGS. 4 and 5, the battery 125 may be removably received in the internal cavity 122 formed in the battery housing 120. As noted above, the cover 124 may selectively open and close the opening into the internal cavity 122. Enclosure of the battery 125 in the battery housing 120 may retain the battery 125 in a secured state, and/or in a connected state, in the battery housing 120. Enclosure of the battery 125 in the battery housing 120, and in particular, with the cover 124 closed against the internal cavity 122, may preclude the infiltration of external debris into the housing 110, and may preclude damage to the battery 125.

Figure 6:
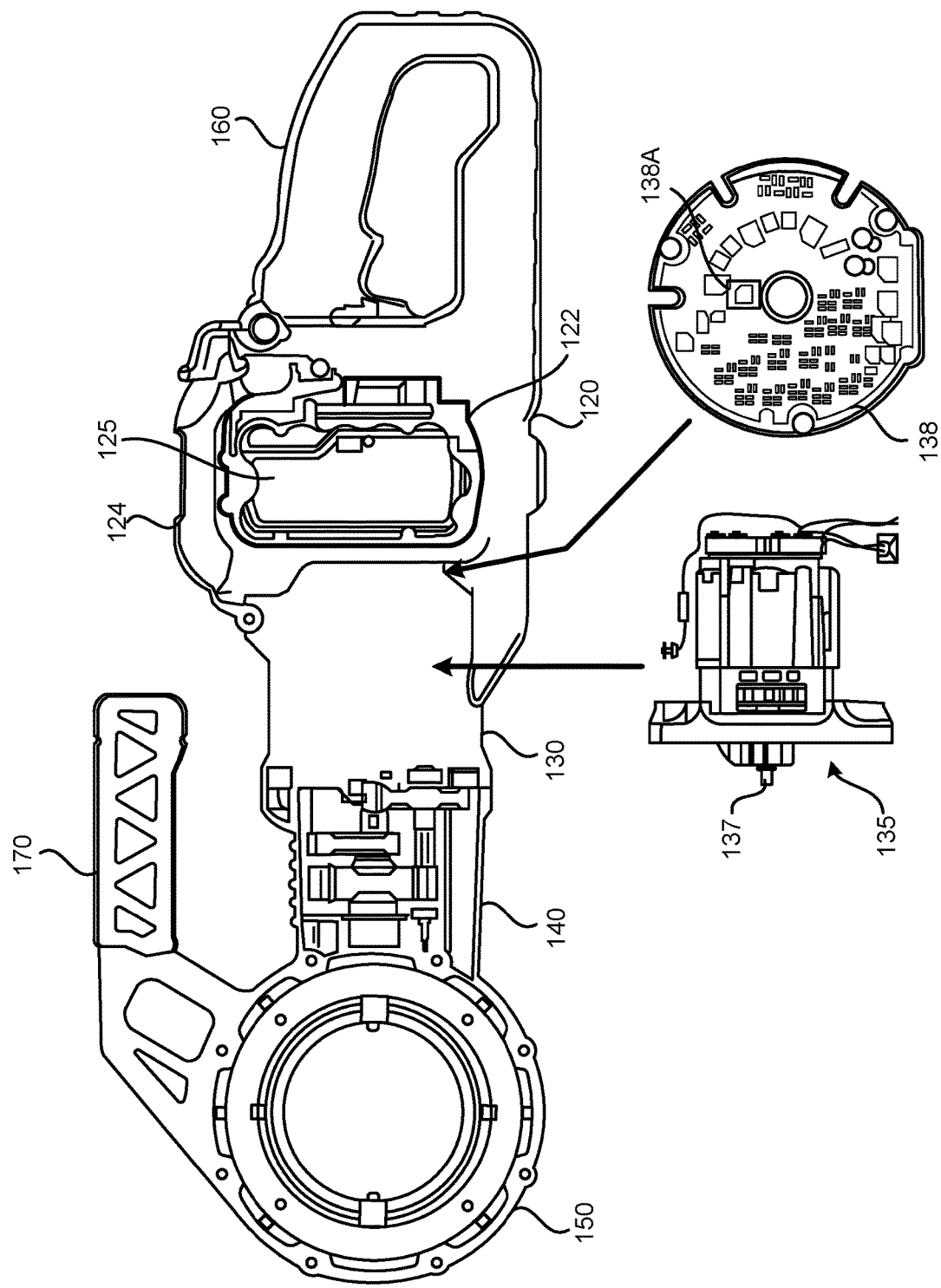
FIG. 6 illustrates a motor and a motor/power control board(s) relative to a motor housing of the exemplary modification device shown in FIGS. 2A and 2B, in accordance with implementations described herein.

As shown in FIGS. 4 and 6, the motor 135 may be received in the motor housing 130. The motor 135 may be connected, for example, by wires, to receive power from the battery 125. A supply of power from the battery 125 to the motor 135 may be controlled by, for example, a power control board 138 selectively supplying power to the motor 135. The power control board 138 may control the supply of power to the motor 135 in response to, for example, manipulation of the motor control switch 112, or forward/reverse switch 112, a position of the power switch 114, or trigger 114, and the like. In some implementations, the power control board 138 may include a motion sensing device 138A. In some implementations, the motion sensing device 138A may detect a displacement and/or a velocity and/or an acceleration of the pipe threader 100 during operation. In some implementations, the motion sensing device 138A may include at least one of an accelerometer, a gyroscope and other such sensors. In some implementations, the power control board 138 may control operation of the motor 135 in a protection mode in response to detection of a displacement, and/or a velocity, and/or an acceleration, of the pipe threader 100 that is greater than a corresponding set threshold value. For example, in the protection mode of operation, the power control board 138 may control the supply of power to the motor 135 to reduce, or suspend, operation of the motor 135, reverse an operation direction of the motor 135, and the like.

Figure 7:
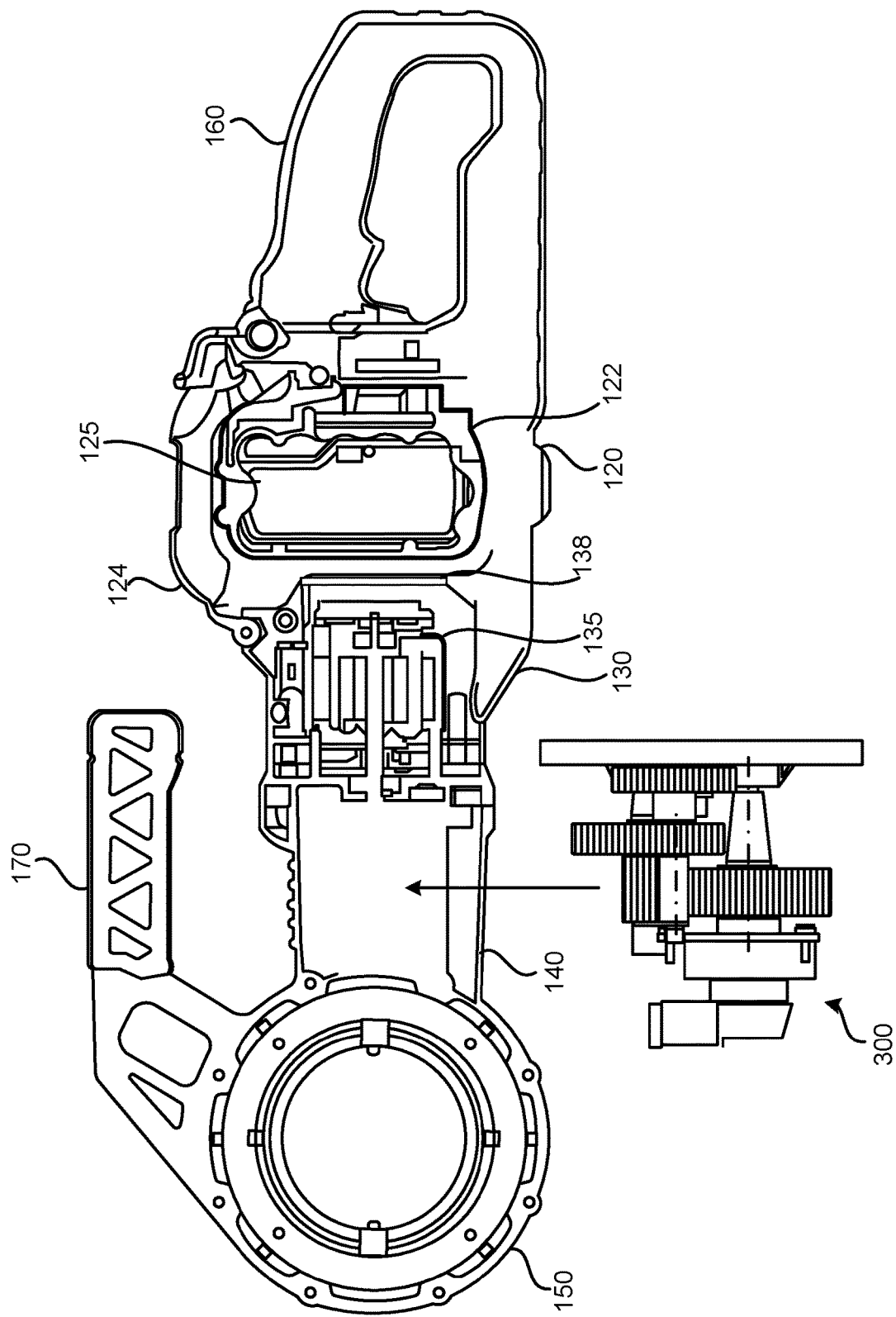
FIG. 7 illustrates an exemplary transmission relative to a transmission housing of the exemplary modification device shown in FIGS. 2A and 2B, in accordance with implementations described herein.

As shown in FIGS. 4 and 7, the transmission 300 may be received in the transmission housing 140. The transmission 300 may transfer power from the motor 135 to the cutting die 155 received in the operating head 150 of the pipe threader 100. That is, as described above, the transmission 300 may transmit force from the motor 135 (operating in the first direction) to the cutting die 155, causing the cutting die 155 to rotate in the first direction. Similarly, the transmission 300 may transmit force from the motor 135 (operating in the second direction) to the cutting die 155, causing the cutting die 155 to rotate in the second direction. The transmission 300 will be described in more detail with respect to FIGS. 8A and 8B.

Figure 8A:
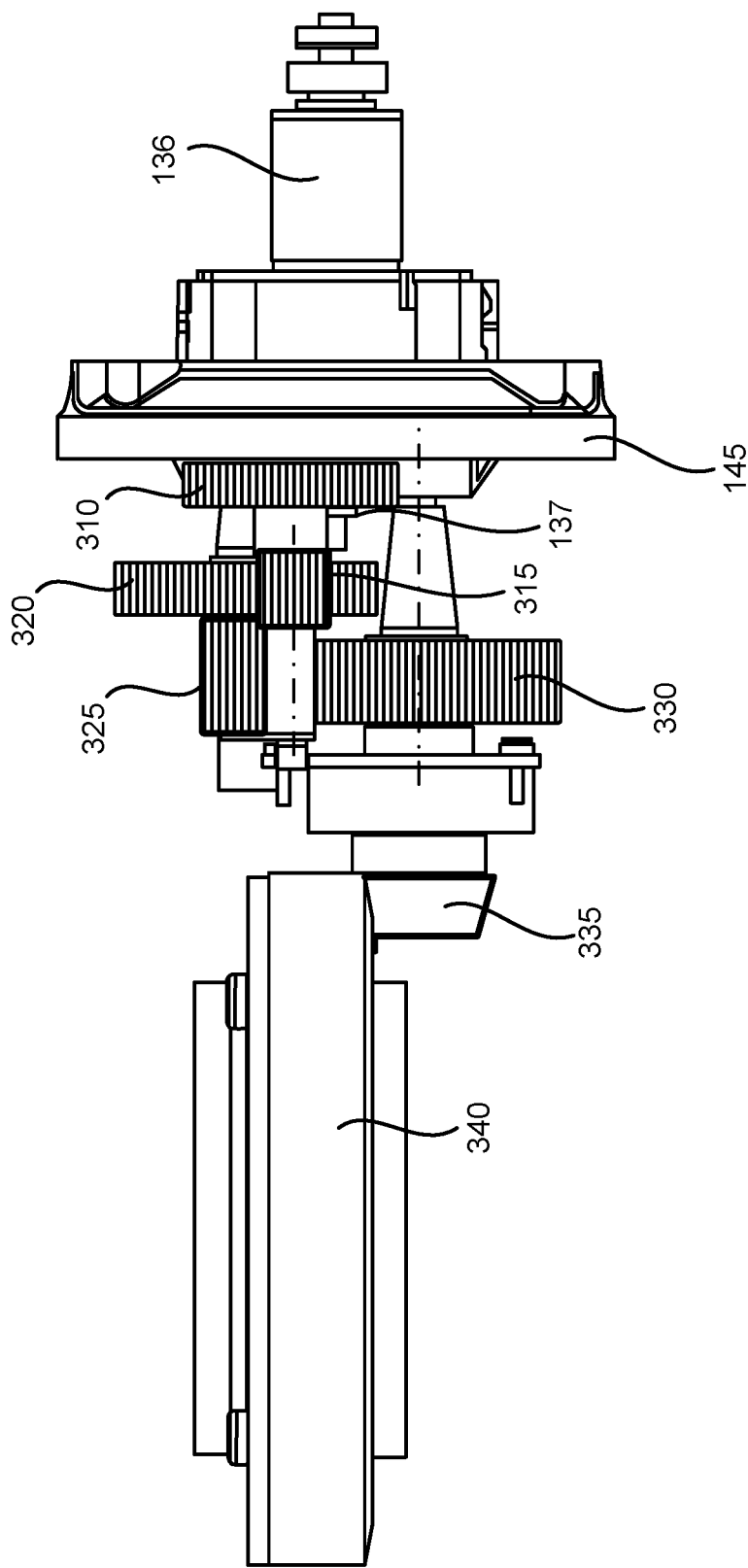
FIG. 8A is a side view.
Figure 8B:
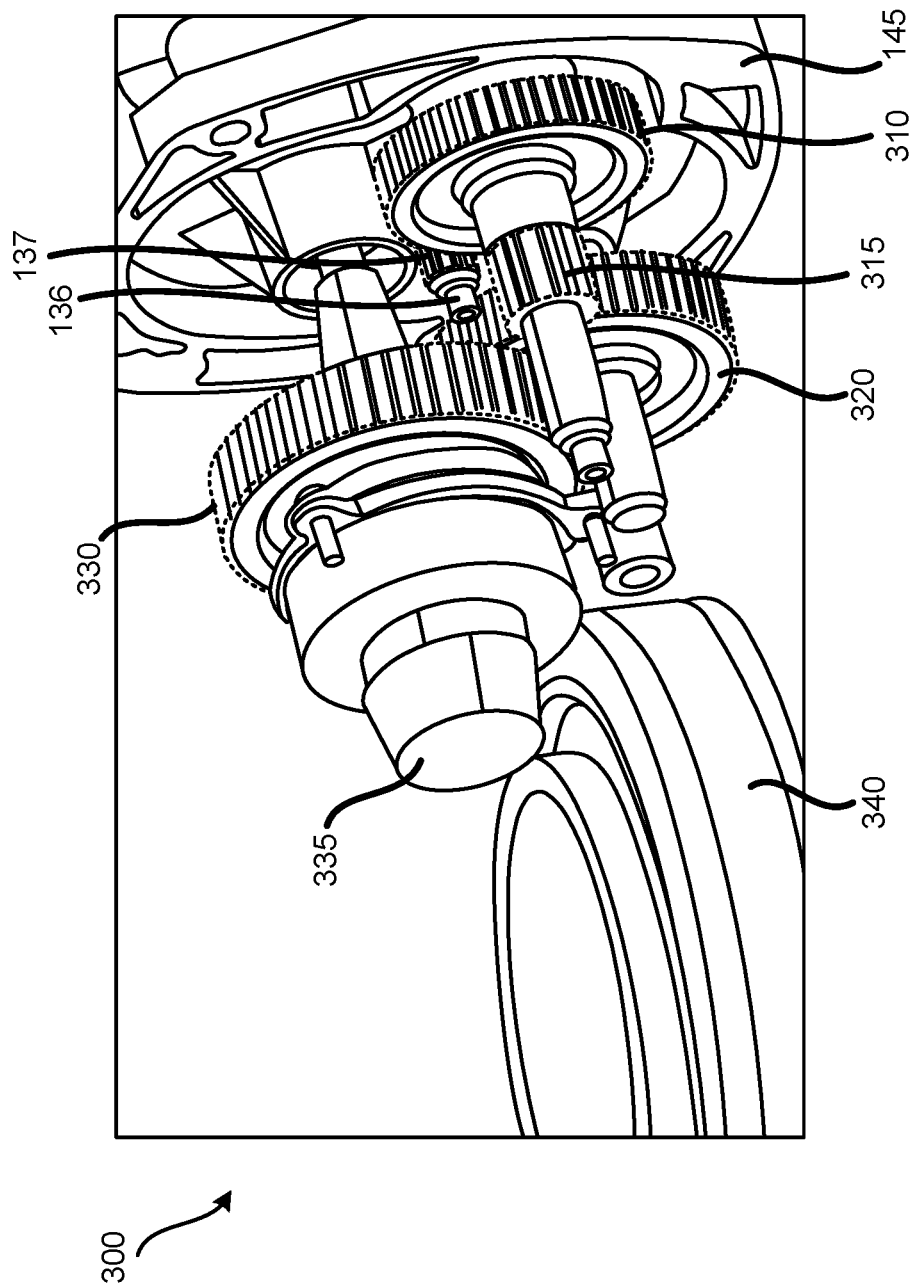
FIG. 8B is a perspective view.
Figure 8C:
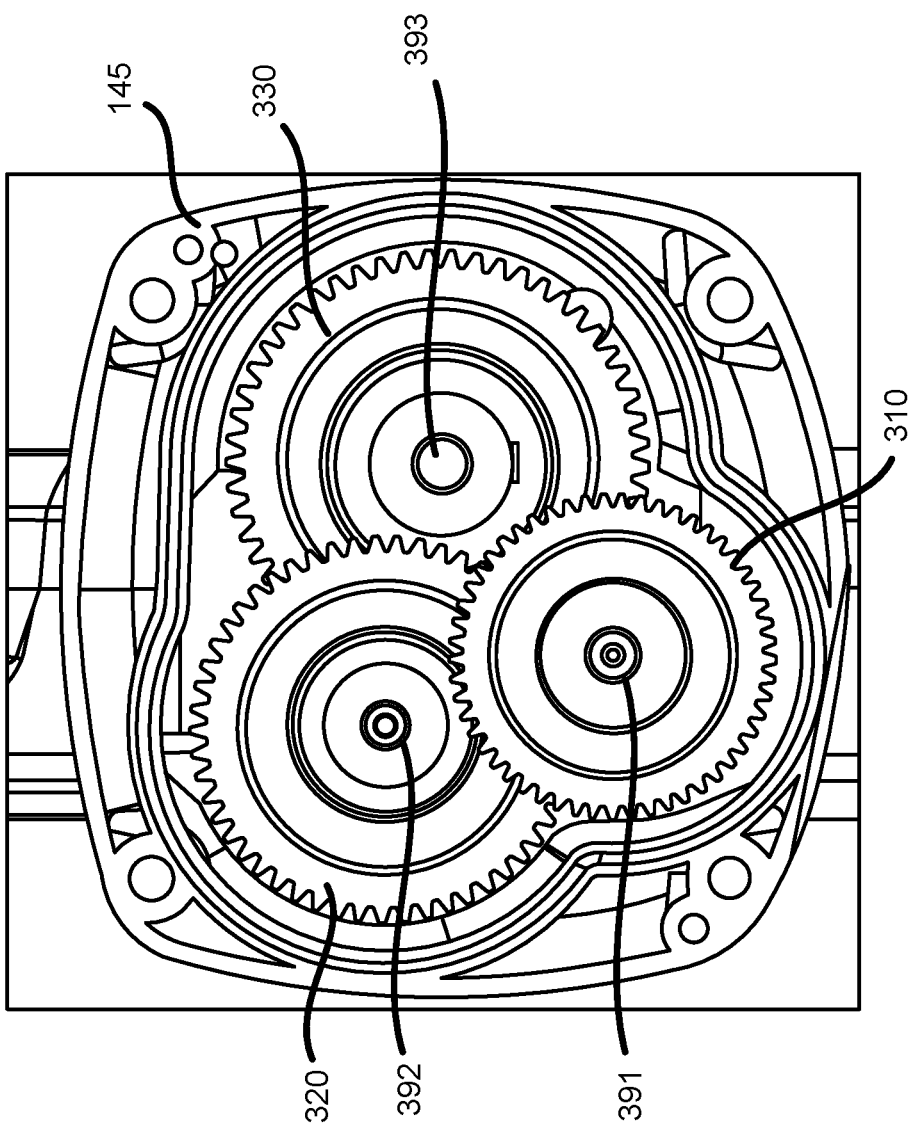
FIG. 8C is a front view, of an exemplary transmission of the exemplary modification device shown in FIGS. 2A and 2B, in accordance with implementations described herein.

FIG. 8A is a side view, FIG. 8B is a perspective view, and FIG. 8C is an end view, of the exemplary transmission 300 to be received in the transmission housing 140 of the exemplary pipe threader 100. In some implementations, a support plate 145 may be positioned between the motor housing 130 and the transmission housing 140, to, for example, support a coupling between the motor 145 and the transmission 300. The exemplary transmission 300 may be coupled to a motor pinion 137 mounted on an output shaft 136 of the motor 135. The exemplary transmission 300 may be, for example, a parallel axis transmission. A first reduction gear 310, mounted on a first shaft 391 of the exemplary transmission 300, may mesh with the motor pinion 137 to transfer power from the motor 135 to the transmission 300. Rotation of the first reduction gear 310 (in response to force transmitted thereto from the motor 135 via the motor pinion 137) may rotate a first reduction pinion 315 also mounted on the first shaft 391. The first reduction pinion 315 may, in turn, mesh with a second reduction gear 320, mounted on a second shaft 392, to rotate the second reduction gear 320. Rotation of the second reduction gear 320 may rotate a second reduction pinion 325, also mounted on the second shaft 392. The second reduction pinion 325 may, in turn, mesh with a third reduction gear 330 mounted on a third shaft 393, to rotate the third reduction gear 330 and a third reduction pinion 335 also mounted on the third shaft 393. The third reduction pinion 335 may, in turn, mesh with a fourth reduction gear 340.

In some implementations, the fourth reduction gear 340 may be an output gear 340, in the form of, for example, a bevel gear 340 that also changes the direction of rotation by 90 degrees. The bevel gear 340, or output gear 340, may transfer the force generated by the motor 135 to the operating head 150 of the pipe threader 100, to provide for the rotation of the cutting die 155. In some implementations, the bevel gear 340, or output gear 340, may be housed in a housing of the operating head 150, against a bearing ring. The force, or torque, generated by the motor 135 may be transmitted to the bevel gear 340, or output gear 340, through the parallel axis arrangement described above. This arrangement of the components of the transmission 300 may cause the bevel gear 340, or output gear 340, to rotate at a slower speed than the motor 135. This transfer of force to the operating head 150 may rotate the cutting die 155 received in the operating head 150. Rotation of the cutting die 155 may cause threads to be cut into an outer circumferential portion of a piece of elongated stock, such as, for example, a pipe, received in the cutting die 155 as described above.

The exemplary transmission 300 shown in FIGS. 8A-3C is a parallel axis transmission, for purposes of discussion and illustration. In some implementations, other arrangement(s) of transmission components such as, for example, a planetary transmission design, may transfer force, i.e., rotational force, from the motor 135 to the operating head 150.

Figure 9:
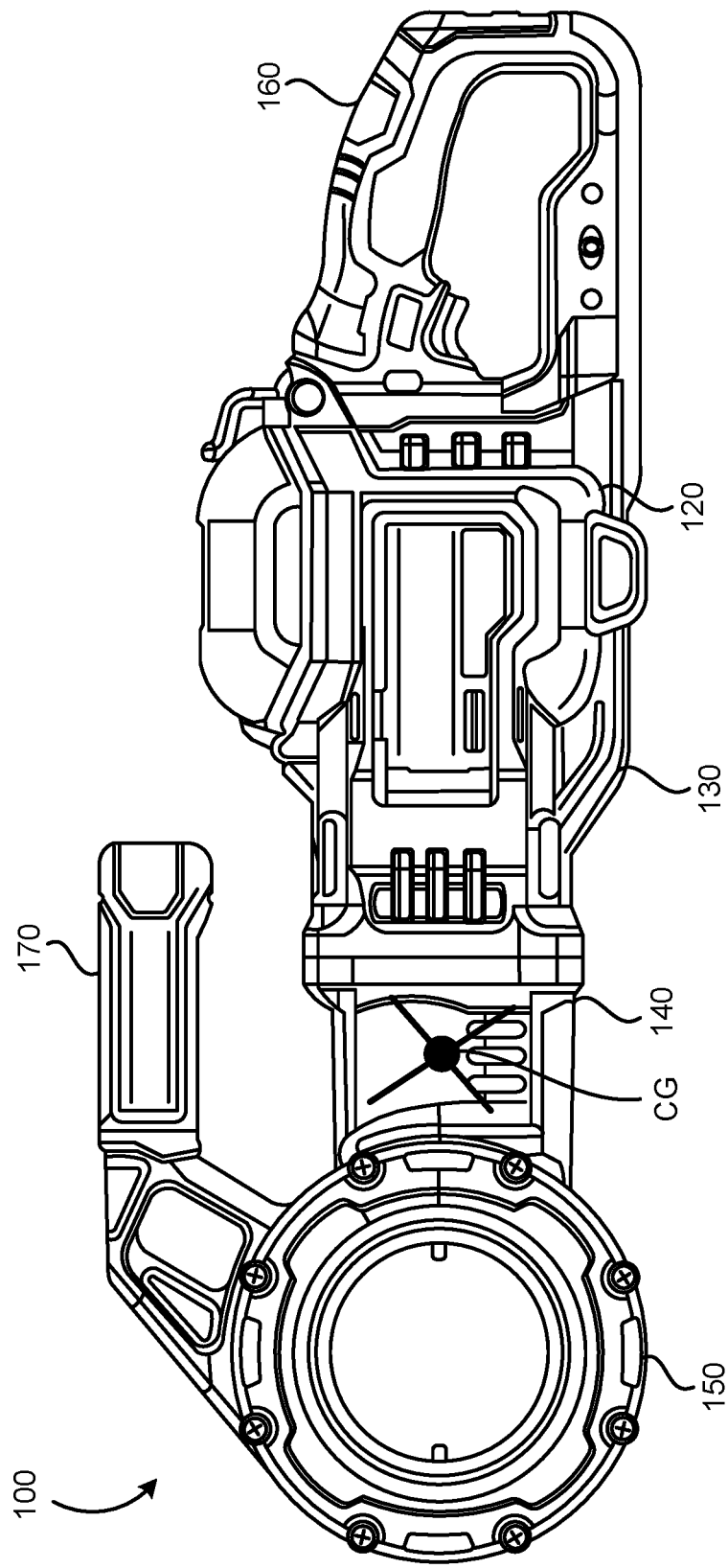
FIG. 9 illustrates a center of gravity of the exemplary modification device shown in FIGS. 2A and 2B, with internal components arranged as shown in FIGS. 4-8, in accordance with implementations described herein.

In the exemplary pipe threader 100 shown in FIGS. 2A and 2B, the arrangement of components shown in FIGS. 3A through 8C may contribute to a positioning of a center of gravity CG of the pipe threader 100 at a location which provides for ergonomic balance of the pipe threader 100. That is, in the exemplary pipe threader 100 having the battery housing 120 (and the battery 125) positioned forward of the rear handle 160, the center of gravity CG of the exemplary pipe threader 100 may be substantially aligned with the front handle 170, as shown in FIG. 9. This arrangement of components may provide for ergonomic balance of the pipe threader 100, which may improve user control of the device, may enhance operational safety, and may improve long term durability of the pipe threader 100.

Figure 2C:
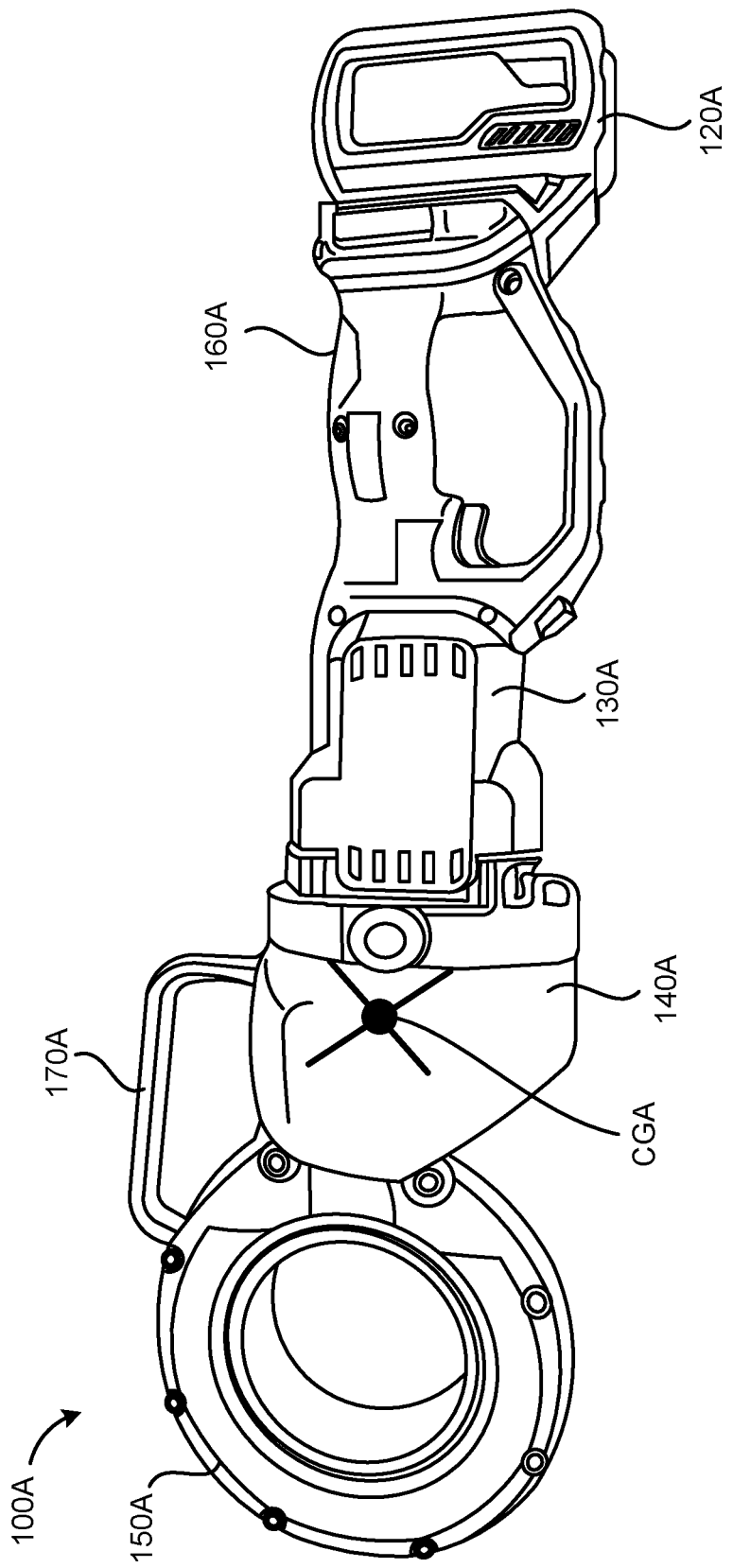
FIG. 2C is a side view of another exemplary modification device, in accordance with implementations described herein.

In some implementations, a modification device 100A, or pipe threader 100A, in accordance with implementations described herein, may have a tool housing 110A including a battery housing 120A, a motor housing 130A, a transmission housing 140A, and a operating head 150A, that are arranged as shown in FIG. 2C. In the exemplary pipe threader 100A shown in FIG. 2C, the battery 125 may be received in the battery housing 120A, the motor 135 may be received in the motor housing 130A, and the transmission may be received in the transmission housing 140A, substantially as described above with respect to the pipe threader 100 shown in FIGS. 2A and 2B. However, in the pipe threader 100A shown in FIG. 2C, the battery/battery housing 120A is positioned at the first end portion of the pipe threader 100A, with a first handle 160A, or rear handle 160A, positioned between the battery/battery housing 120A and the motor housing 130A, and a second handle 170A positioned proximate the transmission housing 140A and operating head 150A. In the exemplary pipe threader 100A shown in FIG. 2C, with components arranged in this manner, a center of gravity CGA of the exemplary pipe threader 100A may be positioned as shown in FIG. 2C. This may provide for some measure of ergonomic balance of the exemplary pipe threader 100A.

The arrangement of components of the exemplary pipe threader 100 shown in FIGS. 2A and 2B, with the battery housing 120 (and battery 125) positioned forward of the rear handle 160, and the center of gravity CG substantially aligned with the front handle 170, may provide improved rigidity of the housing 110, and of the pipe threader 100, particularly in a central portion of the pipe threader 100, compared to that of the exemplary pipe threader 100A shown in FIG. 2C. The improved rigidity provided by the arrangement shown in FIGS. 2A and 2B may further improve stability of the pipe threader 100 during use, and may further improve user control and operational safety.

Figure 10:
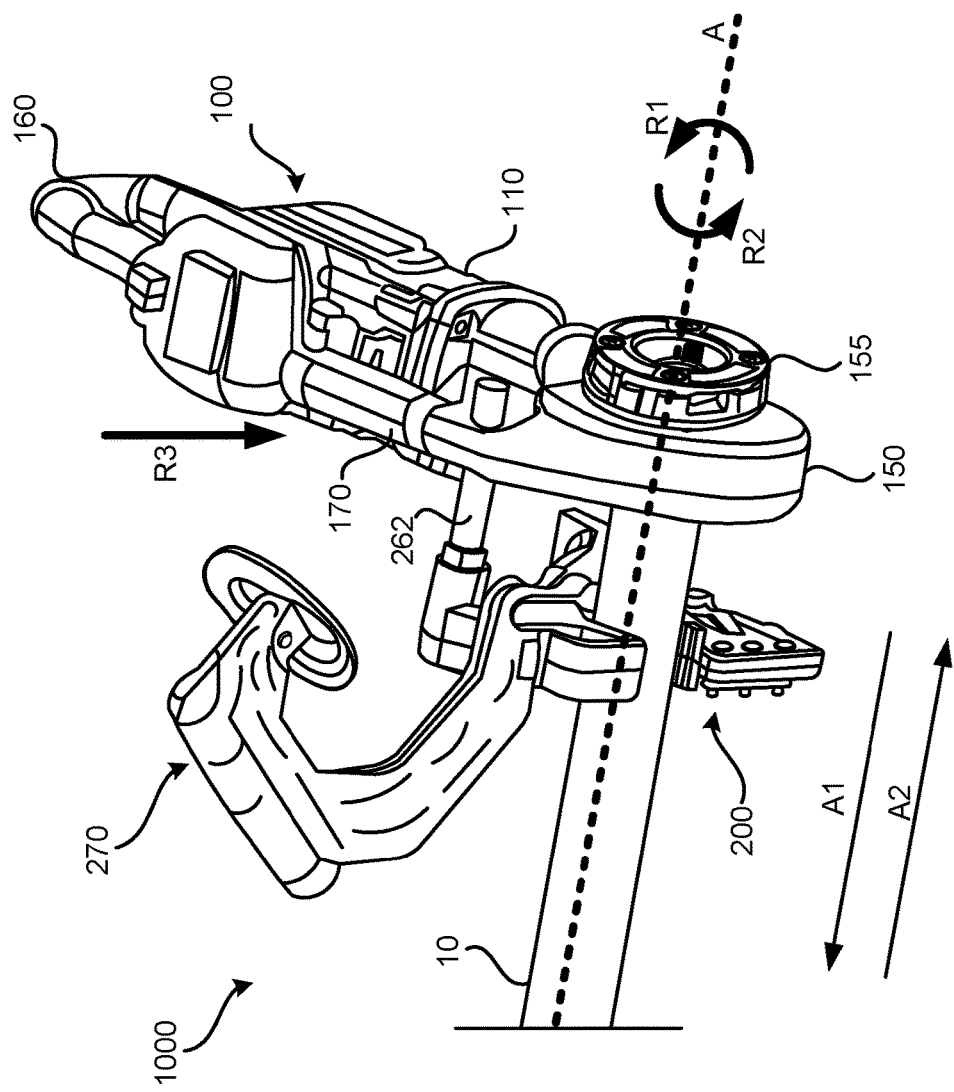
FIG. 10 illustrates an exemplary pipe modification system, including an exemplary modification device and an exemplary support device, in accordance with implementations described herein.

FIG. 10 is a perspective view of the exemplary modification system 1000, in the form of a thread forming system 1000, in accordance with implementations described herein. The exemplary modification system 1000, or thread forming system 1000, shown in FIG. 10 includes the exemplary pipe threader 100 described above with respect to FIGS. 2A and 2B, for purposes of discussion and illustration. The exemplary pipe modification system 1000, or thread forming system 1000, shown in FIG. 10 also includes the support device 200 that maintains, or secures, a position of a piece of elongated stock 10, or pipe 10, relative to the exemplary pipe threader 100. The support device 200, in accordance with implementations described herein, may withstand relatively high torque during operation of the pipe threader 100. The support device 200, in accordance with implementations described herein, may allow an axial biasing force to be applied to the cutting die 155 installed in the operating head 150 of the pipe threader 100. The axial biasing force applied to the cutting die 155 may allow the cutting die 155 to engage an end portion of the elongated stock 10, to initiate modification, for example, threading or cutting, of the elongated stock 10.

Figure 11A:
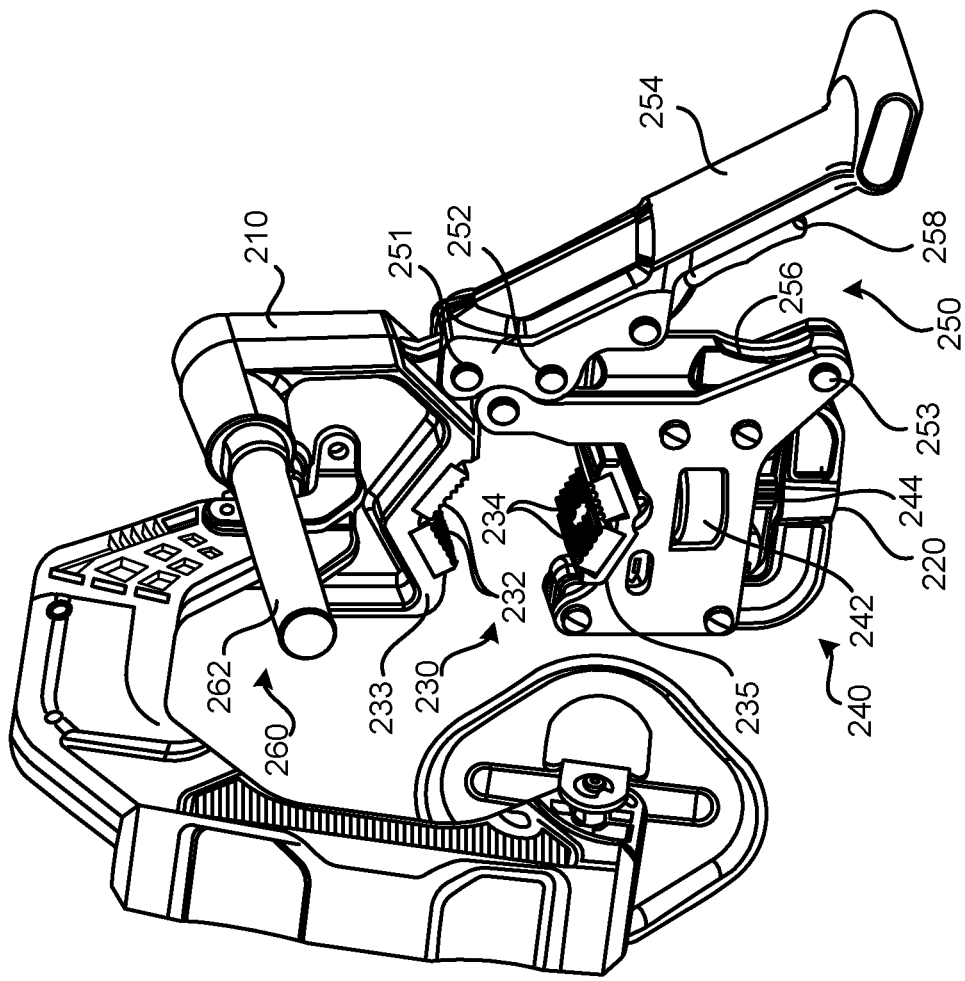
FIG. 11A is a side view of an exemplary support device of the exemplary modification system shown in FIG. 10.
Figure 11B:
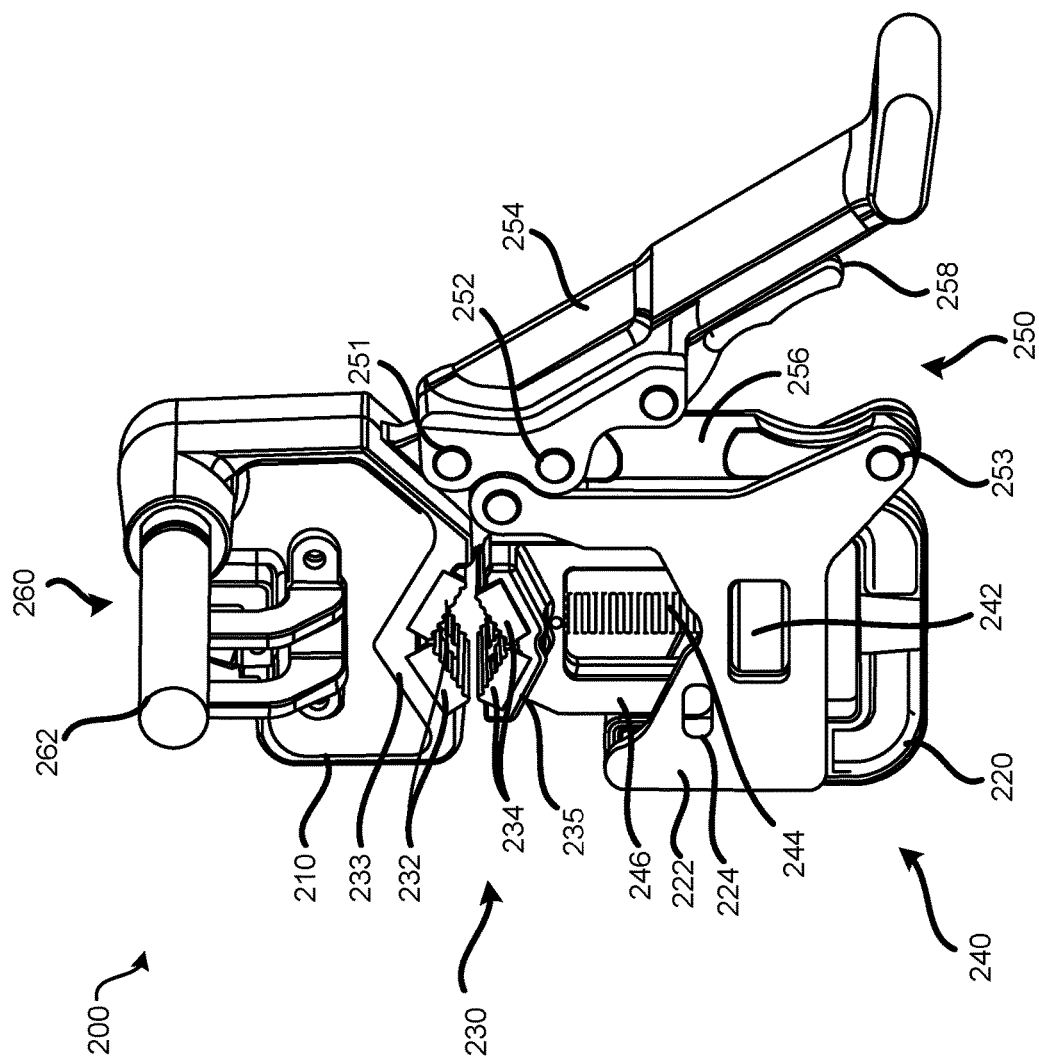
FIG. 11B is a side view of the exemplary support device, with a biasing device removed, in accordance with implementations described herein.

FIG. 11A is a perspective view of the support device 200, in accordance with implementations described herein. FIG. 11B is a perspective view of the support device 200, with a biasing device 270 removed, so that other components of the support device 200 are more easily visible.

As shown in FIGS. 11A and 11B, in some implementations, the support device 200 may include a clamping device 230 that provides for coupling of the stock 10, or pipe 10, and the support device 200. In some implementations, the clamping device 230 may be selectively adjusted in response to manipulation of an adjustment device 240. In some implementations, the clamping device 230 may be selectively engaged with the stock 10, or pipe 10, and disengaged from the stock 10, or pipe 10, in response to manipulation of a latching device 250. In some implementations, the support device 200 may include a reaction arm device 260 that may engage, or abut, the pipe threader 100, to inhibit or restrict rotation of the pipe threader 100. In particular, engagement of the reaction arm device 260 and the pipe threader 100 may inhibit, or restrict, or prevent rotation of the pipe threader 100 about the axis of rotation A of the cutting die 155/cutting head portion of the operating head 150, thus stabilizing a position of the pipe threader 100 during operation. In some implementations, the support device 200 may include a biasing device 270 rotatably coupled to the clamping device 230, and selectively engaging the cutting die 155 installed in the operating head 150 of the pipe threader 100. In some implementations, the engagement of the biasing device 270 with the cutting die 155 may allow an axial force to be safely applied to the cutting die 155, and may allow the cutting die 155 to, in turn, engage the end portion of the pipe 10 held by the clamping device 230 as the cutting die 155 rotates.

As shown in FIGS. 11A and 11B, the support device 200 may include a first support bracket 210, or upper support bracket 210, and a second support bracket 220, or lower support bracket 220 rotatably coupled to a first end portion of the upper support bracket 210. The clamping device 230 may include a first clamping face 232, or upper clamping face 232, on an upper jaw 233 of the upper support bracket 210, and a second clamping face 234, or lower clamping face 234, on a lower jaw 235 of the lower support bracket 220. The upper clamping face 232 and the lower clamping face 234 may be configured to engage the piece of elongated stock 10 to be held, or supported, by the support device 200, for example, for modification during operation of the pipe threader 100. In some implementations, the upper clamping face 232 and/or the lower clamping face 234 may include pads, which may be removable/replaceable wear items on the support device 200.

In some implementations, one of the upper clamping face 232 or the lower clamping face 234 may remain stationary, while the other of the upper clamping face 232 or the lower clamping face 234 may be moveable, so that the upper and lower clamping faces 232 and 234 may be moved into contact, or engagement, with a piece of stock 10, or pipe 10. In the exemplary arrangement shown in FIGS. 11A through 12C, the upper clamping face 232 may remain stationary, or fixed, on the upper support bracket 210, and a position of the lower clamping face 234 may be moved, or adjusted, in response to manipulation of the adjustment device 240.

Figure 12A:
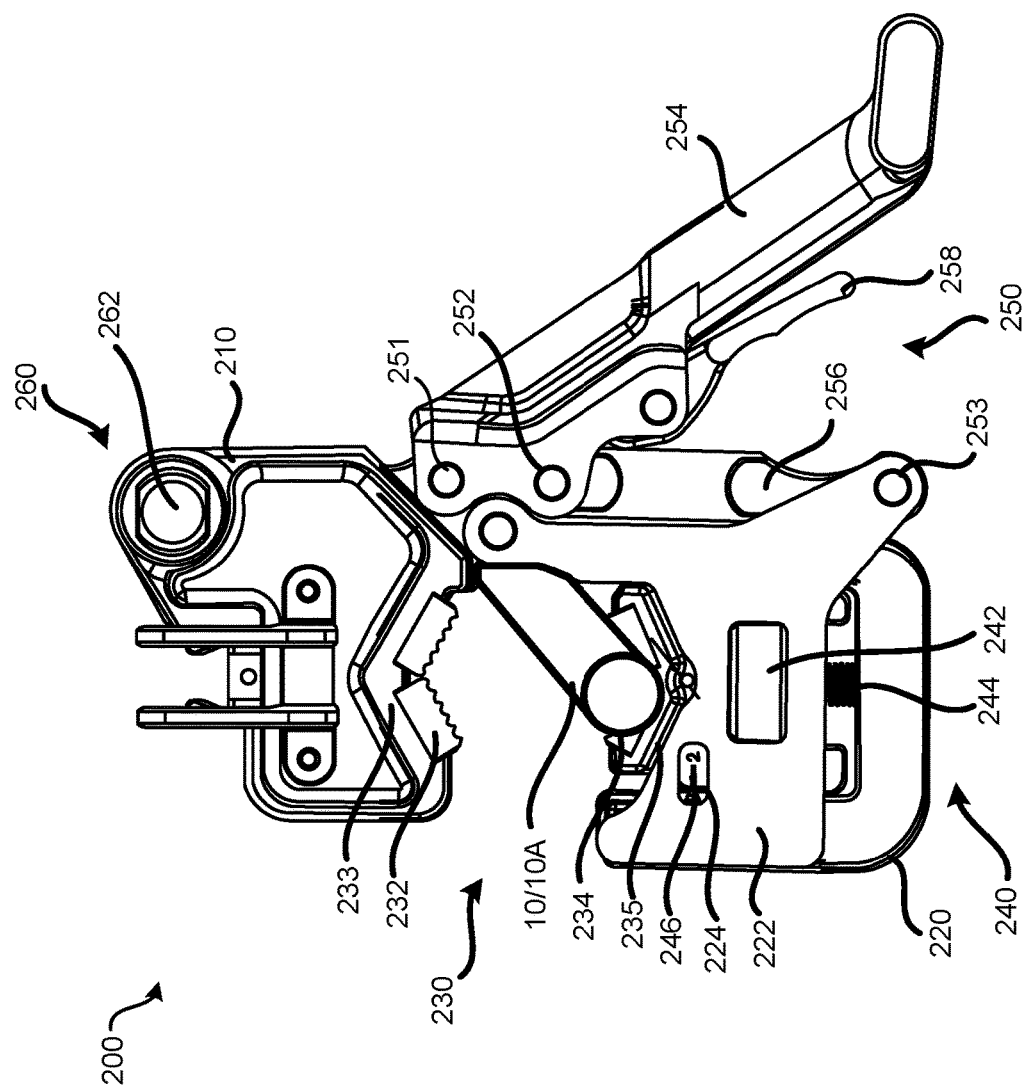
FIGS. 12A-12C illustrate operation of an adjustment device of the exemplary support device shown in FIGS. 10-11B, in accordance with implementations described herein.
Figure 12B:
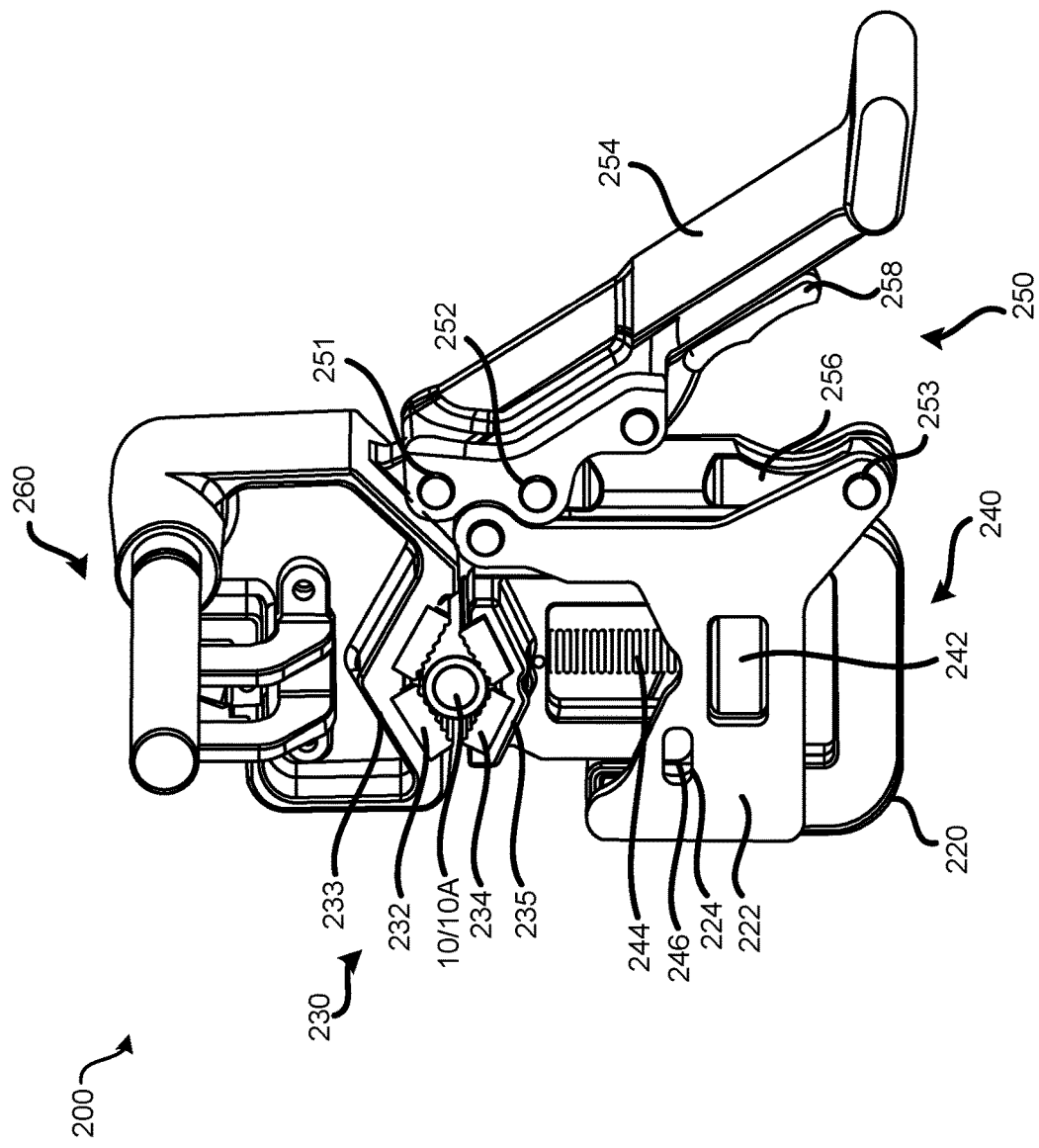

In some implementations, the adjustment device 240 may include a threaded adjusting knob 242 mounted on a threaded rod 244. The lower clamping face 234 may be coupled to an end portion of the threaded rod 244. As the adjusting knob 242 is manipulated, for example, rotated, on the threaded rod 244, the adjusting knob 242 may move axially along the threaded rod 244. As the adjusting knob 242 is rotated in a first direction, the lower clamping face 234 may be moved upward, in a direction toward the upper clamping face 232, in response to rotation of the adjusting knob 242 in the first direction and corresponding upward movement of the threaded rod 242, while the lower support bracket 220/side plate 222 remains stationary, as shown in FIG. 12B. Similarly, as the adjusting knob 232 is rotated in a second direction, the lower clamping face 234 may be moved downward, in a direction away from the upper clamping face 232, in response to rotation of the adjusting knob 242 in the second direction and corresponding downward movement of the threaded rod 244, while the lower support bracket 220/side plate 222 remains stationary, as shown in FIG. 12A.

Figure 12C:
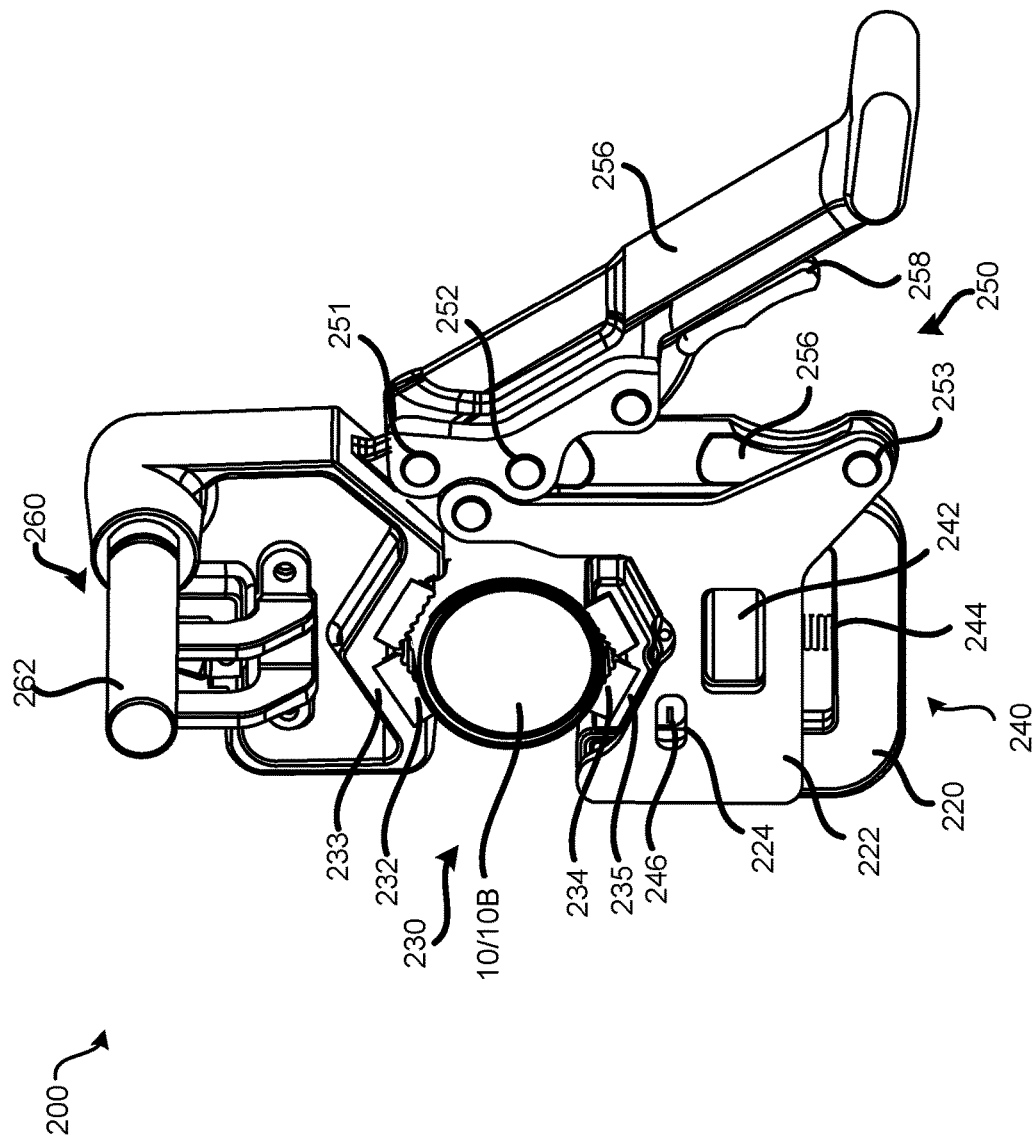

This type of manipulation of the adjustment device 240 may allow the clamping device 230 to be tightened against the pipe 10, to secure a position of the pipe 10 for threading. This type of manipulation of the adjustment device 240 may allow the clamping device 230 to be released from the pipe 10, to allow the pipe 10 to be removed after threading is complete. This type of manipulation of the adjustment device 240 may allow the clamping device 230 to accommodate different sizes and/or configurations of elongated stock 10 in the support device 200. For example, FIG. 12B illustrates a first pipe 10A secured in the support device 200, and FIG. 12C illustrates a second pipe 10B secured in the support device 200, a diameter of the second pipe 10B being greater than a diameter of the first pipe 10A. In this example, the adjustment device 240 has been manipulated to properly position the upper and lower clamping faces 232, 234 of the clamping device 230 to receive and secure the respective pipes 10A and 10B in the support device 200.

In some implementations, the adjustment device 240 may include a scale indicator 246 that is visible to the operator, to facilitate adjustment of the position of the clamping faces 232, 234. In the exemplary implementation shown in FIGS. 11B and 12B, the scale indicator 246 is provided on the lower jaw 235. In this exemplary arrangement, the user may read the scale indicator 246 through a slot 224 formed in a side plate 222 of the lower support bracket 220. Reading of the scale indicator 246 in this manner may provide the user with indexing, facilitating the accommodation of a particular size of pipe 10 between the clamping faces 232, 234. This ability to rapidly adjust the spacing between the upper and lower jaws 233, 235 may facilitate the rapid accommodation of pieces of stock 10 within the clamping faces 232, 235 of the jaws 233, 235.

In some implementations, the latching device 250 may be actuated, or engaged, to selectively inhibit, or restrict, relative rotation of the upper support bracket 210 and the lower support bracket 220, and maintain a secured position of the elongated stock 10 in the support device 200. For example actuation of the latching device 250 may maintain the respective positions of the components of the support device 200, and of the pipes 10 supported in the support device 200, as shown in FIGS. 12B and 12C. Similarly, the latching device 250 may be disengaged, or released, to allow for the relative rotation of the upper support bracket 210 and the lower support bracket 220, and for the release of the stock 10, or pipes 10, from the support device 200.

Figure 13A:
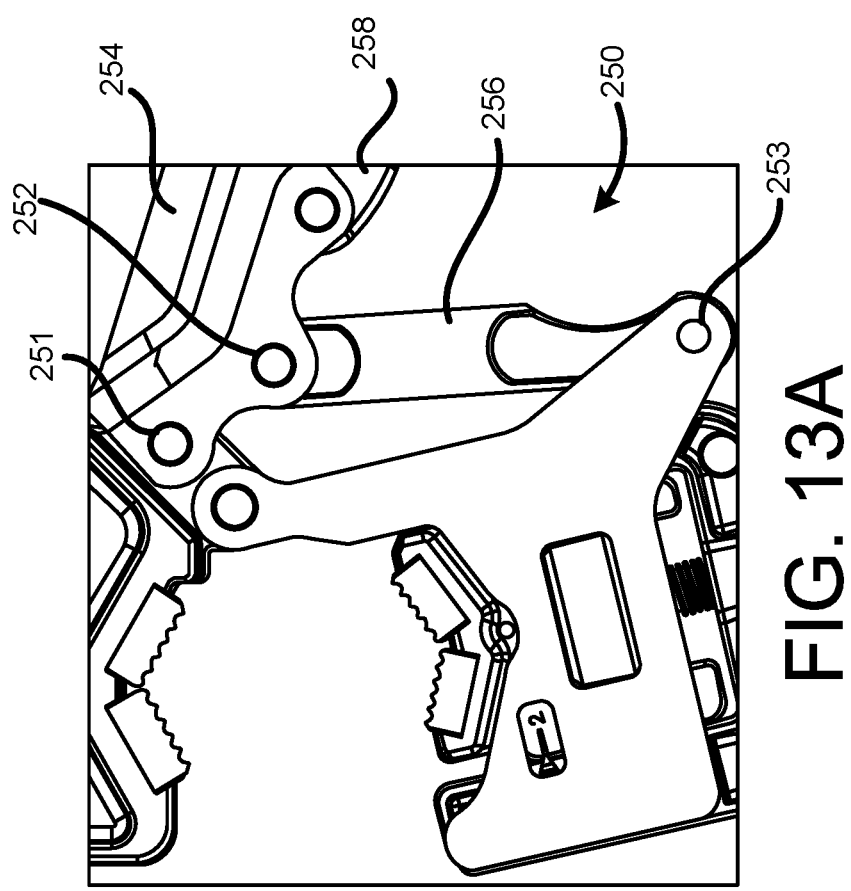
FIGS. 13A-13E illustrate operation of a latching mechanism of the exemplary support device shown in FIGS. 10-11B, in accordance with implementations described herein.

As shown in FIGS. 13A-13E, the latching mechanism 250 may include a latch handle 254 rotatably coupled to the first end portion of the upper support bracket 210 at a first pivot pin 251. A link 256 may be rotatably coupled between the latch handle 254 and the lower support bracket 220. A first end portion of the link 256 may be rotatably coupled to the latch handle 254 at a second pivot pin 252, and a second end portion of the link 256 may be rotatably coupled to the lower support bracket 220 at a third pivot pin 253. FIG. 13A illustrates the latching device 250 in a disengaged, or unactuated position. From the position shown in FIG. 13A, a piece of stock 10 may be positioned in the clamping device 230, i.e., between the first and second clamping faces 232, 234, and the adjustment device 240 may be manipulated to secure the stock 10 in the clamping device 230, as shown in FIG. 12B. The latching device 250 may then be actuated to inhibit, or restrict, relative rotation of the upper and lower support brackets 210, 220, and maintain the secured, clamped position of the stock 10 in the clamping device 230.

Figure 13B:
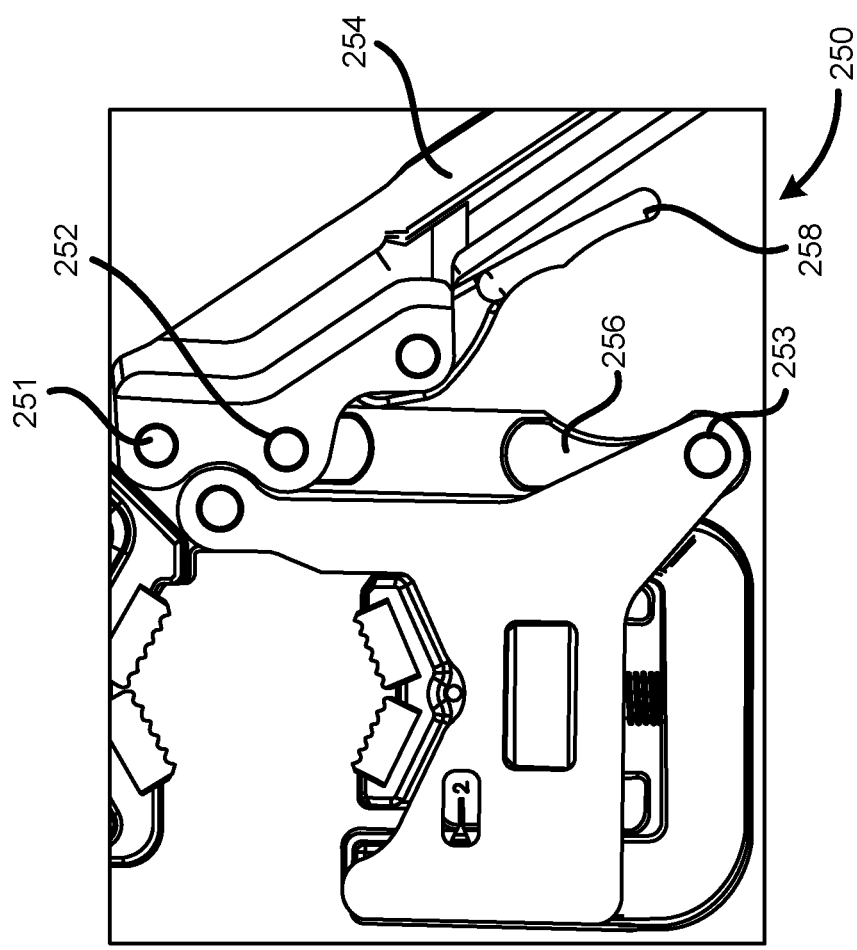
Figure 13C:
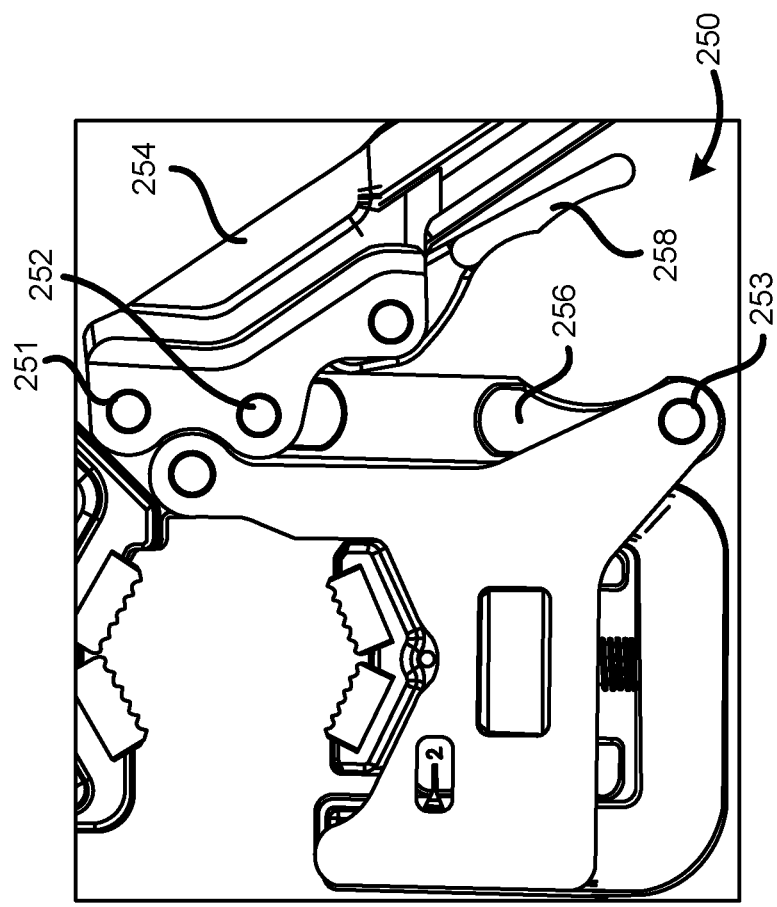

To actuate the latching device 250, the latch handle 254 may be rotated from the position shown in FIG. 13A, through the interim position shown in FIG. 13B, and into the position shown in FIG. 13C. At the interim position shown in FIG. 13B, the link 256 is at a top dead center position, in which the first pivot pin 251, the second pivot pin 252 and the third pivot pin 253 are aligned in a straight line. As the link 256 rotates past the top dead center position, and into the position shown in FIG. 13C, the first end portion of the link 256 and the second pivot pin 252 are offset from the first pivot pin 251 and the third pivot pin 253. In this position of the link 256 (and the latch handle 254), rotation of the upper support bracket 210 and the lower support bracket 220 is inhibited, or restricted, thus maintaining the clamped position of the first and second clamping faces 232, 234 against the piece of stock 10. In some implementations, the link 256 may be adjustable in length, to provide for fine adjustment of the latching provided by the latching device 250.

Figure 13D:
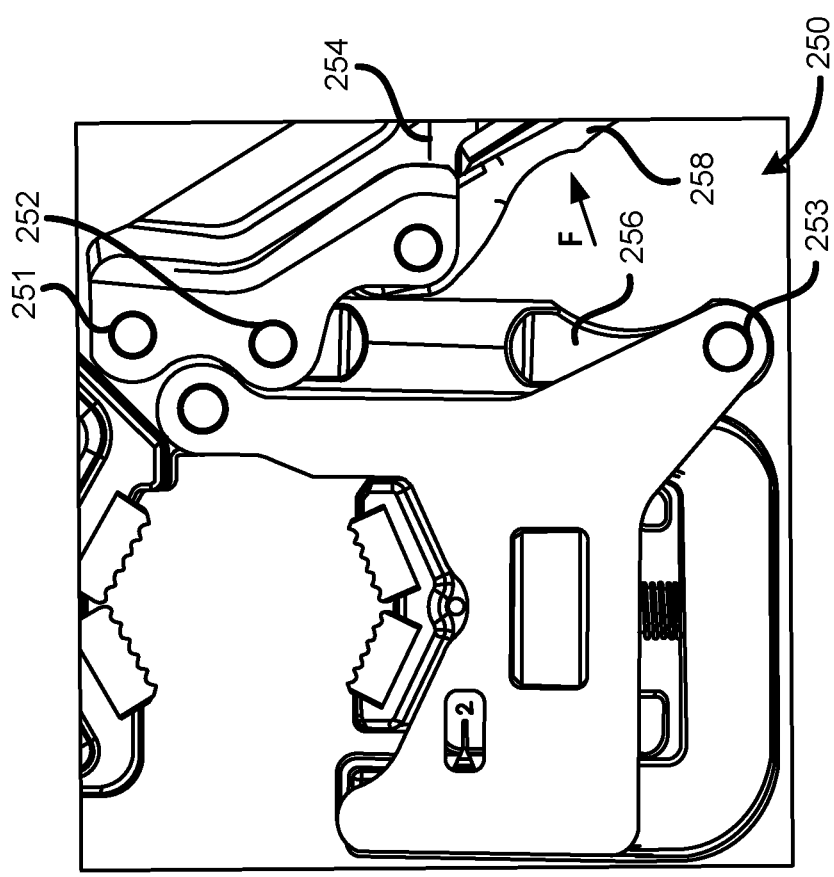
Figure 13E:
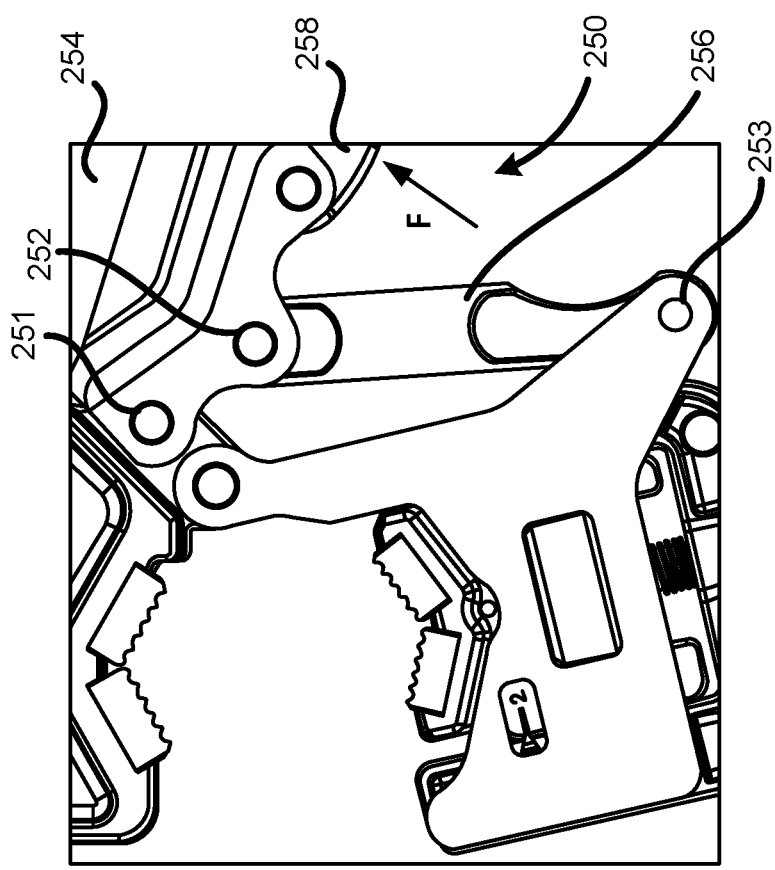

Actuation of a release lever 258 may release, or disengage, the latching device 250, allowing for rotation of the upper and lower support brackets 210, 220, and removal of the piece of stock 10 from the support device 200. That is, as shown in FIG. 13D, application of an external force on the release lever 258, in the direction of the arrow F, pushing the release lever 258 toward the latch handle 254, may release, or disengage, the latching device 250, as shown in FIG. 13E. In the position shown in FIGS. 13C and 13D, the upper end portion of the release lever 258 is in contact with the link 256. In response to application of the force F, the upper end portion of the release lever 258 cams against the link 256, snapping the link 256 out of the locked, or latched, position, and releasing or disengaging the latching device 250.

The ability to latch, and unlatch, the support device 200 in the manner described above, may allow for a relatively rapid removal of a completed work piece, and placement of a new work piece in the support device 200, particularly when processing work pieces of essentially the same size (i.e., diameter). Manipulation of the adjustment device 240 as described above may provide for fine adjustment of the positioning of the clamping faces 232, 234 in securing the work piece in the support device 200.

Returning back to the exemplary system 1000 shown in FIG. 10, the piece of elongated stock 10 (such as the exemplary pipe 10 referenced above for purposes of description and illustration) may be secured by the support device 10 as described with respect to FIGS. 11A through 13E. The modification device, such as the exemplary pipe threader 100, may be positioned at the end portion of the pipe 10. The end of the pipe 10 may be positioned in the operating head 150 of the pipe threader 100, for example, in the cutting die 155 installed in the operating head 150, so that operation of the pipe threader 100 may cause threads to be formed in the end portion of the pipe 10.

As described above and shown in FIG. 10, operation of the motor 135 in the first direction (for example, the forward direction) may cause corresponding rotation of the cutting die 155 in the first direction R1 about the axis of rotation A of the cutting die 155 and/or the central longitudinal axis A of the elongated piece of stock 10 received in the cutting die 155. As the cutting die 155 is installed in, and fixed in the die housing of the operating head 150 of the pipe threader 100, this rotation of the cutting die 155 may cause rotation of, essentially the entire pipe threader 100 about the axis of rotation A. Without the reaction arm device 260, this resulting rotation of the pipe threader 100 would require the user to maintain an external force in the direction R3 on the pipe threader 100 to maintain safe, stable operation of the pipe threader 100. Accordingly, in some implementations, the reaction arm device 260 may selectively engage the pipe threader 100, to inhibit or restrict rotation of the pipe threader 100, and in particular, rotation of the housing 110 of the pipe threader 100 and the components received therein, about the axis of rotation A. The reaction arm device 260 may include a reaction arm 262 coupled to the support device 200. A first end portion of the reaction arm 262 may be coupled to the upper support bracket 210, and a second end portion of the reaction arm 262 may be configured to abut a portion of the pipe threader 100, so as to inhibit, or restrict, rotation of the pipe threader 100 about the axis of rotation A, during operation of the motor 135 and corresponding rotation of the cutting die 155 engaged with the pipe 10. For example, the second end portion of the reaction arm 262 may be configured to engage a retaining portion of the pipe threader 100.

In the example shown in FIG. 10, the retaining portion of the pipe threader 100 is defined by a slot 172 formed in the front handle 170, in which the second end portion of the reaction arm 262 is received. In some implementations, the retaining portion may be defined by, for example, a lower surface 174 of the front handle 170, an outer surface 152 of the operating head/housing 110 of the pipe threader 100, and the like, which the second end portion of the reaction arm 262 may abut, or contact, so as to inhibit or restrict rotation of the pipe threader 100. Engagement, for example, physical engagement, of the reaction arm 262 with the pipe threader 100 in this manner may inhibit, or restrict, or prevent rotation of the pipe threader 100 about the axis of rotation of the cutting die 155/cutting head of the operating head 150, thus stabilizing a position of the pipe threader 100 during operation. In some implementations, a reaction arm, similar to the reaction arm 262 shown in FIG. 10, may be included on the pipe threader 100, to engage a corresponding portion of the support device 200. For example, in some implementations, the support device 200 may include a slot, similar to the slot 172 shown in FIG. 10, in which such a reaction arm of the pipe threader 100 may be received. Engagement in this manner may stabilize a relative position of the pipe threader 100, the support device 200, and the piece of stock 10, during operation.

Figure 14A:
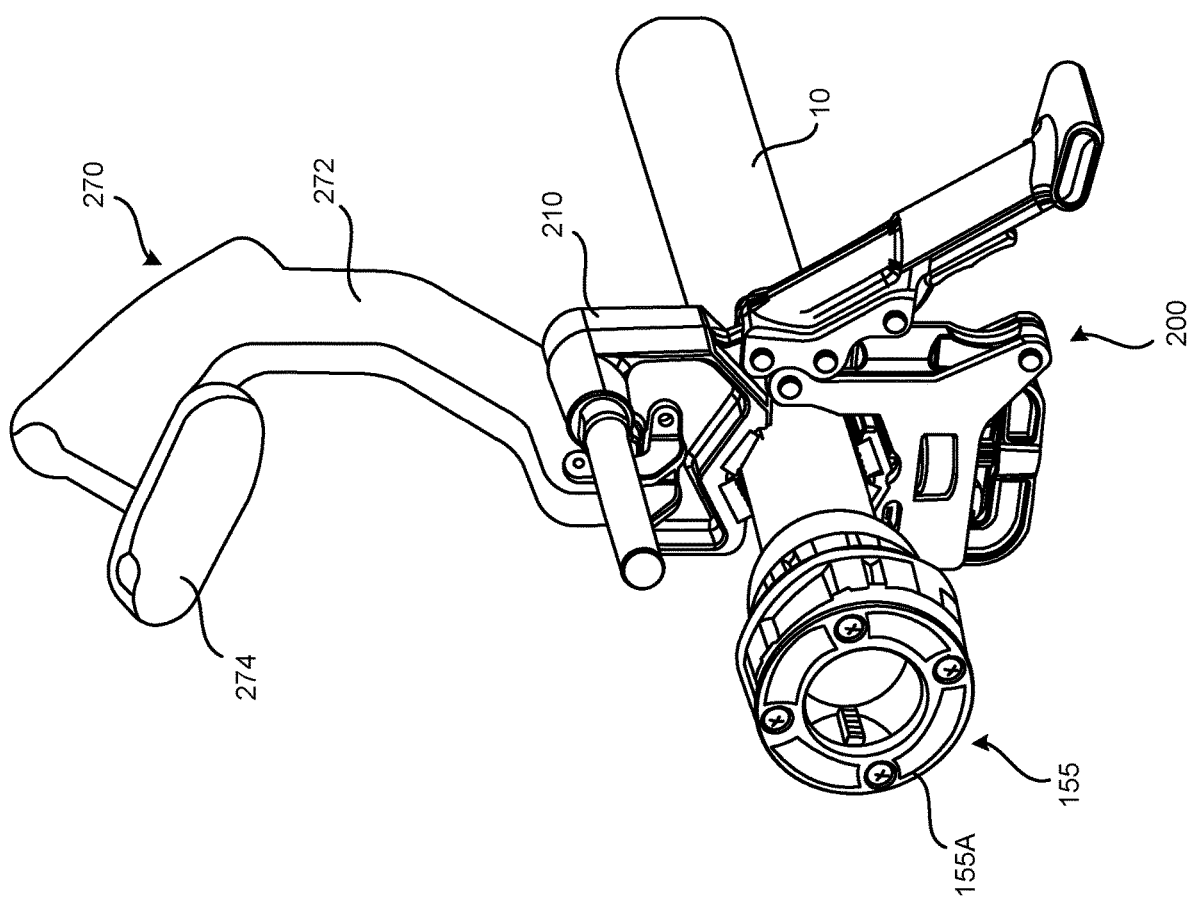
FIGS. 14A-14E illustrate operation of a biasing device of the exemplary support device shown in FIGS. 10-11B, in accordance with implementations described herein.

An exemplary biasing device 270 is illustrated in FIGS. 14A-14E. In particular, FIG. 14A is a perspective view of the exemplary support device 200 including the exemplary biasing device 270, with a pipe secured in the support device 200. In the exemplary arrangement shown in FIG. 14A, the cutting die 155 is positioned on the end portion of the pipe 10, but not installed in the operating head 150 of the pipe threader 100, simply so that components of the support device 200 are more easily visible. FIGS. 14B-14E are cross sectional views of operation of the exemplary biasing device 270, in accordance with implementations described herein. In the example shown in FIGS. 14A-14E, the biasing device 270 is rotatably coupled to the upper support bracket 210 of the support device 200, such that an axial biasing force may be applied to the cutting die 155 by a downward application of external force to the biasing device 270. However, the biasing device 270 may be coupled to other portions of the support device 200, and/or may be coupled in other orientations, with a direction of the application of the external force adjusted accordingly to apply the desired axial biasing force to the cutting die 155. For example, in some implementations, the biasing device 270 may be coupled to the support device 200 so that the biasing device 270 slides, via, for example, a rack and pinion mechanism, or other such mechanism, to allow for application of an axial biasing force as described.

Modification, for example, threading, of a piece of elongated stock 10, such as, for example a pipe 10, by, for example, the exemplary pipe threader 100, may require that an axial force to be applied to the cutting die 155, while the cutting die 155 is rotating, to initiate engagement between the cutting die 155 and the outer circumferential surface of the pipe 10, and initiate the cutting of threads into the pipe 10. For example, in some situations, an operator may place a hand directly on the outer facing side of the cutting die 155, while the cutting die 155 is rotating, to urge the rotating cutting die 155 onto the pipe 10 and initiate threading. This direct contact between the hand of the user and the rotating cutting die 155 may present safety hazards during operation, and/or may not yield the desired results. That is, this direct contact with the rotating cutting die 155 may expose the hand of the user to burrs, metal debris, burning, blistering and the like. Additionally, depending on the size and/or type of stock 10 being modified, an operator may not be able to produce sufficient axial force in this manner, and/or may cause instability in the mounting of the stock 10 and/or fixture when applying an axial force in this manner. Accordingly, a biasing device 270, in accordance with implementations described herein, may allow an operator to apply an axial biasing force to the rotating cutting die 155 safely, and with relatively less effort.

In the exemplary biasing device 270 shown in FIGS. 14A-14E, the biasing device 270 is coupled, for example, rotatably coupled, to the support device 200, simply for purposes of discussion and illustration. In the exemplary biasing device 270 shown in FIG. 14A, the biasing device 270 is rotatably coupled to the upper support arm 210, for purposes of discussion and illustration. The exemplary biasing device 270 may include a biasing arm 272, with a first end portion of the biasing arm 272 being rotatably coupled to the upper support bracket 210. A biasing plate 274 may be coupled to a second end portion of the biasing arm 272. In some implementations, the biasing device 270 may include a biasing handle 276 to facilitate the rotation of the biasing device 270, and the application of the axial biasing force. The operator may rotate the biasing arm 272, so as to selectively bring the biasing plate 274 into contact with the outward facing side 155A of the cutting die 155.

Figure 14B:
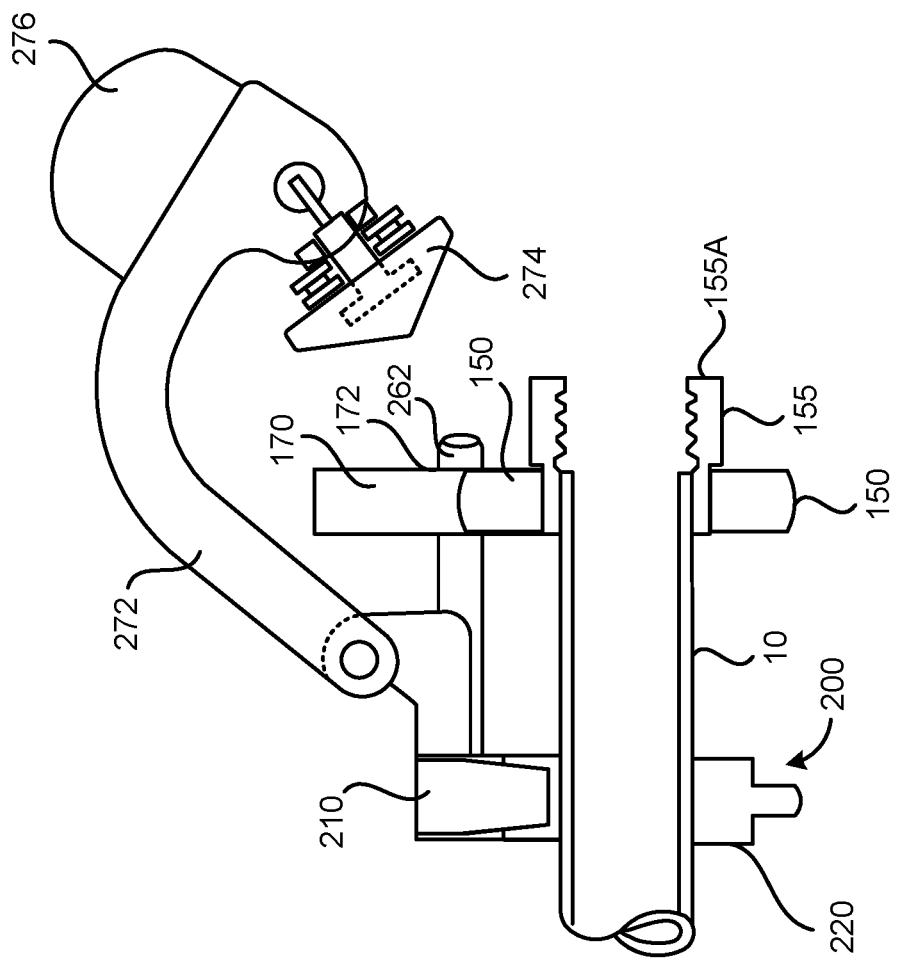
Figure 14C:
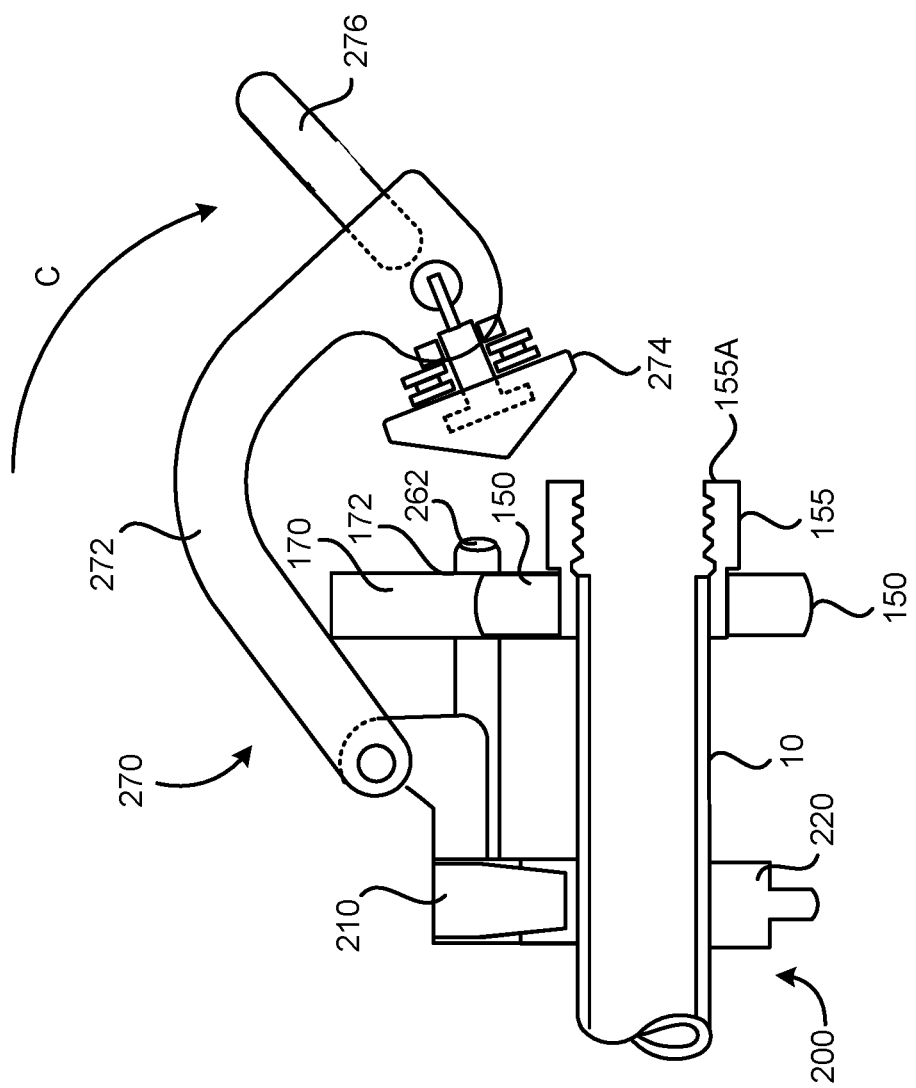
Figure 14D:
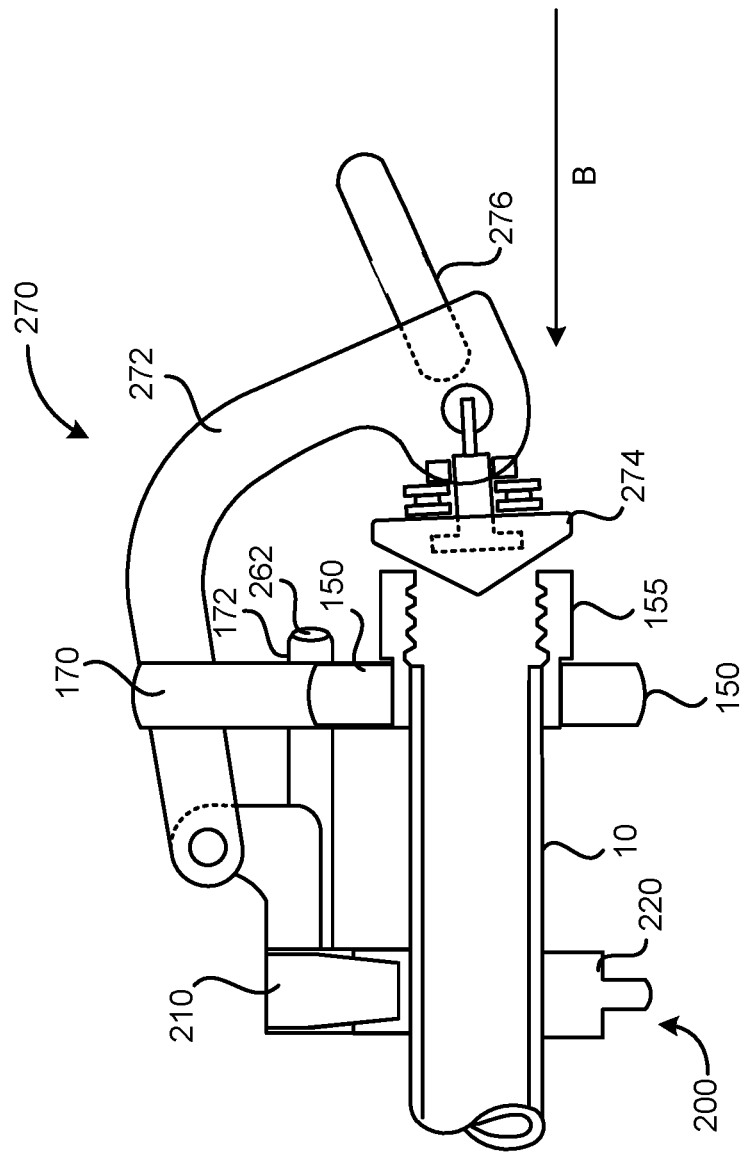
Figure 14E:
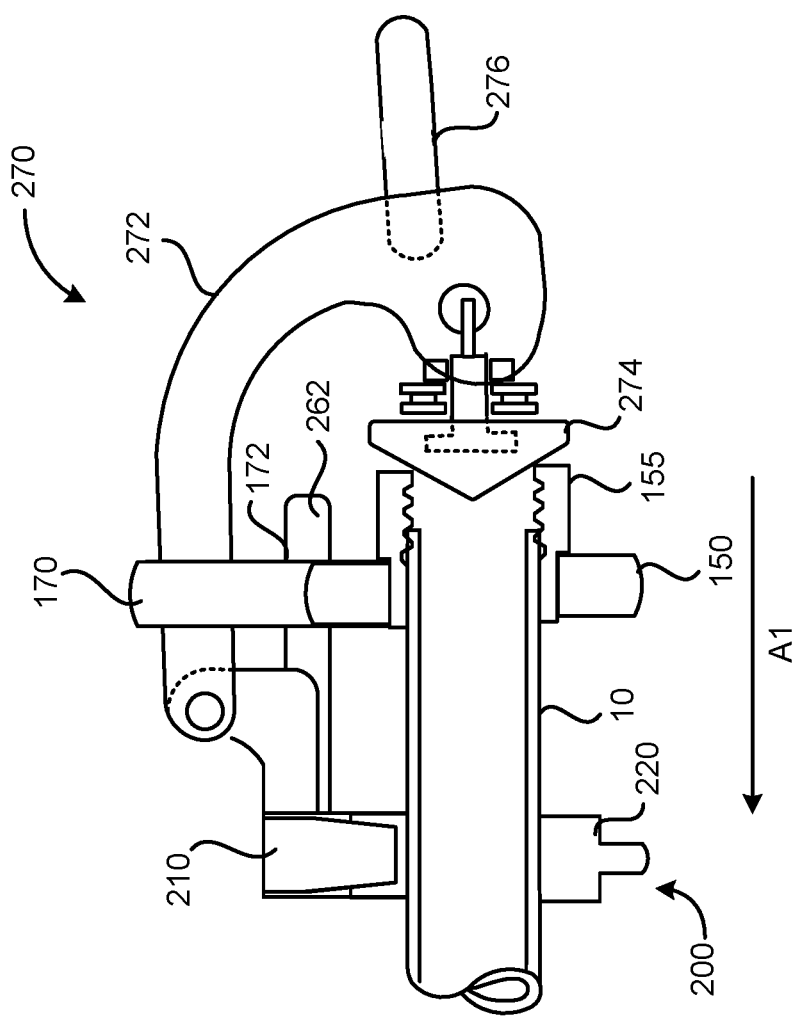

In particular, in FIG. 14B, the biasing device 270 is in a position that is rotated away from the cutting die 155 and the end portion of the pipe 10 to be threaded by the cutting die 155. The pipe 10 may be secured in the support device 200, for example, by the clamping device 230, the adjusting device 240 and the latching device 250, with the reaction bar 262 engaged with the retaining portion of the pipe threader 100, as described above. Power may then be supplied to the motor 135, and a force generated by the motor 135 may be transmitted to the cutting die 155, to rotate the cutting die 155 about the axis of rotation A, as described above. With the cutting die 155 rotating, the operator may rotate the biasing device 270 about the first end of the biasing arm 272, for example, in the direction C, as shown in FIG. 14C. Contact between the biasing plate 274 and the (rotating) cutting die 155 may be established by continued rotation of the biasing device 270 in the direction C. With the biasing plate 274 in contact with, or aligned with the cutting die 155 as shown in FIG. 14D, the operator may apply an axial biasing force B. Application of the axial biasing force in the direction B, through the positioning of the biasing plate 274 against the cutting die 155, may cause the cutting die 155 to move axially, in the direction A1 along the pipe 10, as the cutting die 155 rotates, and the cutting surfaces of the cutting die 155 are brought into contact with the outer circumferential surface of the pipe 10, as shown in FIG. 14E.

As the cutting surfaces of the cutting die 155 engage the outer circumferential surface of the pipe 10, and the cutting die 155 continues to rotate (for example, in the first direction R1 as described above with respect to FIG. 10), the cutting surfaces may cut threads into the end portion of the pipe 10. With the cutting die 155 and the pipe 10 engaged in this manner, the external axial force may no longer be required for the cutting die 155 to continue to move axially in the axial direction A1 and cut threads into the pipe 10. When the threading operation is complete, an operation direction of the motor 135 may be changed, or reversed, causing the cutting die 155 to rotate in the second direction R2. Rotation of the cutting die 155 in the second direction R2 may cause the cutting die 155 to travel along the pipe 10 in the direction axial A2, back through the previously cut threads, so that the cutting die 155 and the pipe 10 may be disengaged.

In some implementations, the operational speed of the motor 135 (and the corresponding rotational speed of the cutting die 155) in the second direction R2 may be greater than the operational speed of the motor 135 (and the corresponding rotational speed of the cutting die 155) in the first direction R1. The reduced resistance between the cutting die 155 and the previously cut threads during rotation of the cutting die 155 in the second direction R2 may allow for relatively rapid disengagement of the cutting die 155 and the pipe 10 once the threading operation is complete, thus enhancing operator convenience and utility. In some implementations, the rotational speed may be set based on a detected operational direction of the motor 135. In some implementations, the rotational speed may be set based on a detected operator manipulation of the motor control switch 112.

As described above, in some implementations, the power control board 138 may include the motion sensing device 138A, including, for example, the gyroscope and/or the accelerometer that may selectively control operation of the motor 135 in a protection mode of operation. That is, in response to detection by the gyroscope and/or the accelerometer of the motion sensing device 138A of a displacement and/or a velocity and/or an acceleration of the pipe threader 100 that exceeds a corresponding preset threshold during operation, the power control board 138 may control the supply of power to the motor 135 to reduce, or suspend, operation of the motor 135. In some implementations, in implementing the protection mode, the power control board 138 may reverse the operation direction of the motor 135. The anti-kickback protection provided by operation in the protection mode may enhance safety both to the operator, and in the surrounding operational environment.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A thread forming system, comprising:
   a power tool, including:
   a tool housing;
   a motor disposed in the tool housing; and
   a cutting head coupled to the tool housing and rotatably driven relative to the tool housing by the motor to form threads in an elongated piece of stock receivable in the cutting head
   wherein the tool housing and the cutting head are configured to move together axially along a longitudinal axis of the piece of stock to form the threads; and
   a support device, including:
   a clamping device configured to secure a position of the piece of stock relative to the power tool for the cutting head to form the threads;
   a reaction arm coupled to the clamping device and configured to abut a portion of the tool housing to inhibit rotation of the tool housing relative to the piece of stock while the cutting head is forming threads; and
   a biasing device including a biasing arm having a first end portion thereof moveably coupled to the clamping device, the biasing device being configured to selectively engage the cutting head so as to bias the cutting head along the longitudinal axis.

2. The system of claim 1, wherein the clamping device further comprises:
   an upper support bracket with a first clamping face configured to engage the piece of stock; and
   a lower support bracket movably coupled to the upper support bracket, with a second clamping face opposite the first clamping face and configured to engage the piece of stock.

3. The system of claim 2, wherein one of the upper support bracket or the lower support bracket is rotatably moveable relative to the other of the upper support bracket or the lower support bracket.

4. The system of claim 2, wherein the clamping device further comprises a latching device including an over center latch coupled between the lower support bracket and the upper support bracket.

5. The system of claim 4, wherein the over center latch comprises:
   a latch handle;
   a first pivot pin rotatably coupling the latch handle to the upper support bracket;
   a link;
   a second pivot pin rotatably coupling a first end of the link to the latch handle; and
   a third pivot pin rotatably coupling a second end of the link to the lower support bracket.

6. The system of claim 5, wherein, in a first position of the latch handle and the link, the upper support bracket is rotatable relative to the lower support bracket.

7. The system of claim 6, wherein, in a second position of the latch handle and the link, rotation of the upper support bracket relative to the lower support bracket is restricted, such that a relative position of the upper support bracket and the lower support bracket is secured.

8. The system of claim 7, wherein the latch handle and the link are moved from the first position to the second position in response to rotation of the latch handle about the first pivot pin in a first direction, in which the second pivot pin and the first end portion of the link are moved past an alignment position with the first pivot pin and the third pivot pin.

9. The system of claim 7, further comprising a fourth pin, rotatably coupling an end portion of a release handle to the latch handle, wherein,
   in the first position, the release handle is aligned along the latch handle, and
   in the second position, the release handle is rotated about the fourth pivot pin such that the release handle is separated from the latch handle, and
   the second pivot pin and the first end portion of the link are rotated away from the lower support bracket in response to rotation of the release handle toward the latch handle to allow rotation of the upper support bracket and the lower support bracket.

10. The system of claim 2, further comprising a threaded adjustment knob on the one of the upper support bracket or the lower support bracket, wherein a position of one of the first clamping face or the second clamping face is movable relative to the other of the first clamping face or the second clamping face in response to manipulation of the threaded adjusting knob.

11. The system of claim 10, wherein the first clamping face is stationary, and the second clamping face is movable in a first direction toward the first clamping face in response to manipulation of the threaded adjusting knob in a first direction, and the second clamping face is movable in a second direction away from the first clamping face in response to manipulation of the threaded adjusting knob in a second direction.

12. The system of claim 1, wherein the tool housing extends transverse to the piece of stock when the cutting head is forming threads, and the reaction arm extends transverse to the tool housing when the cutting head is forming threads.

13. The system of claim 1, wherein the biasing arm is pivotable relative to the clamping device.

14. The system of claim 13, further comprising a biasing plate coupled to a second end portion of the biasing arm, wherein the biasing plate is configured to selectively contact the cutting head based on a position of the biasing arm relative to the clamping device.

15. The system of claim 14, wherein the biasing plate is configured to transfer an axial force to the cutting head in response to an external force applied to the biasing device, as the as the biasing arm and the biasing plate pivot relative to the clamping device, and toward the cutting head.

16. The system of claim 1, wherein the power tool includes:
    a motion sensor configured to sense rotational motion of the housing about the longitudinal axis; and
    a controller configured to control operation of the motor and to initiate a protective operation when the sensed rotational motion exceeds a predetermined threshold.

17. The system of claim 16, wherein the sensed rotational motion includes at least one of a rotational displacement, a rotational velocity, or a rotational acceleration.

18. The system of claim 16, wherein the protective operation includes at least one of shutting off power to the motor, reducing power to the motor, pulsing power to the motor, braking the motor, or reversing a direction of rotation of the motor.

19. The system of claim 16, wherein the sensor comprises at least one of a gyroscope or an accelerometer.

20. The system of claim 1,
    wherein the tool housing includes:
        a battery housing defining an internal cavity configured to receive a battery;
        a motor housing adjacent to the battery housing that contains the motor; and
        a transmission positioned between the motor housing and the cutting head, the transmission housing containing a transmission that is driven by the motor; and
    wherein the power tool also includes:
        a first handle coupled to a first end portion of the tool housing, such that the battery housing is positioned between the first handle and the motor housing; and
        a second handle coupled to the cutting head; and
        wherein a center of gravity of the power tool is positioned along the tool housing, at a position substantially aligned with the second handle.

* * * * *